(12) United States Patent
Yasui

(10) Patent No.: US 8,671,665 B2
(45) Date of Patent: Mar. 18, 2014

(54) EXHAUST GAS PURIFYING APPARATUS FOR INTERNAL COMBUSTION ENGINE

(75) Inventor: Yuji Yasui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 578 days.

(21) Appl. No.: 13/005,398

(22) Filed: Jan. 12, 2011

(65) Prior Publication Data

US 2011/0192144 A1  Aug. 11, 2011

(30) Foreign Application Priority Data

Feb. 9, 2010 (JP) .................................. 2010-26282

(51) Int. Cl.
*F01N 11/00* (2006.01)
*F01N 3/18* (2006.01)

(52) U.S. Cl.
USPC ................................. 60/286; 60/285; 60/295

(58) Field of Classification Search
USPC ........................................... 60/285, 286, 295
See application file for complete search history.

(56) References Cited

U.S. PATENT DOCUMENTS

2007/0028601 A1  2/2007  Duvinage et al.

FOREIGN PATENT DOCUMENTS

| DE | 102 40 833 A1 | 3/2004 |
|---|---|---|
| JP | 59-007741 A | 1/1984 |
| JP | 07-088331 A | 4/1995 |
| JP | 10-26040 A | 1/1998 |
| JP | 2007-192058 A | 8/2007 |
| WO | WO 2004/090296 A1 | 10/2004 |
| WO | WO 2007/096064 A1 | 8/2007 |
| WO | WO 2008/081286 A1 | 7/2008 |

OTHER PUBLICATIONS

Japanese Office Action from JP App. No. 2010-026282 dated on Jan. 24, 2012.

*Primary Examiner* — Thomas Denion
*Assistant Examiner* — Brandon Lee
(74) *Attorney, Agent, or Firm* — Arent Fox LLP

(57) ABSTRACT

An exhaust gas purifying apparatus for an internal combustion engine is provided. The apparatus includes a first catalyst and a second catalyst. The first catalyst is provided in an exhaust passage of the engine, and can remove NOx in exhaust gases from the engine when an air-fuel ratio of an air-fuel mixture burning in the engine is in the vicinity of the stoichiometric ratio. The second catalyst is provided downstream of the first catalyst, an can remove NOx in the exhaust gases using a reducing agent. An execution condition of a lean operation in which the air-fuel ratio is set to a lean air-fuel ratio which is leaner than the stoichiometric ratio, is determined. When switching the air-fuel ratio from an air-fuel ratio in the vicinity of the stoichiometric ratio to the lean air-fuel ratio, the air-fuel ratio is controlled to a rich air-fuel ratio which is richer than the stoichiometric ratio, during a lean transition period from the time the execution condition is satisfied. The air-fuel ratio is controlled to the lean air-fuel ratio after the lean transition period has elapsed.

19 Claims, 18 Drawing Sheets

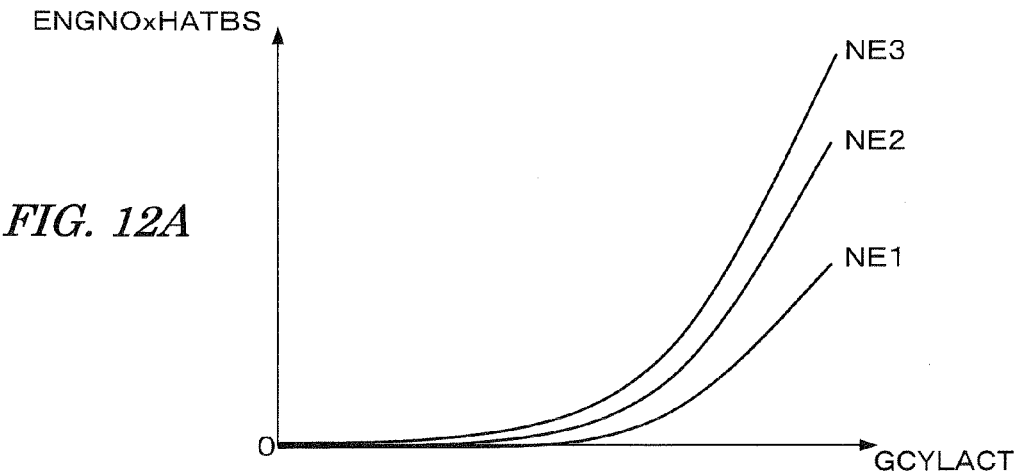
FIG. 12A
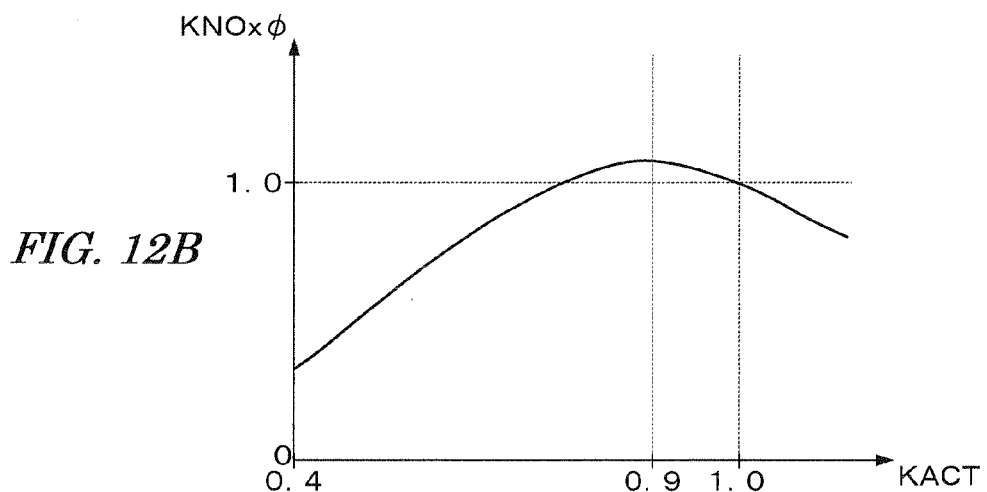
FIG. 12B
FIG. 13
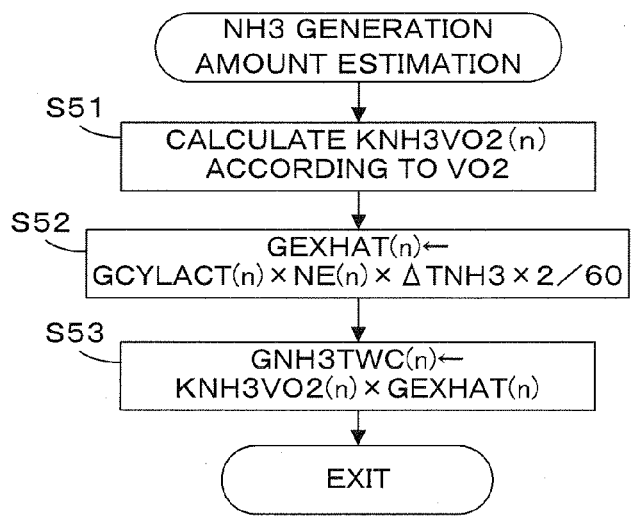

FIG. 21
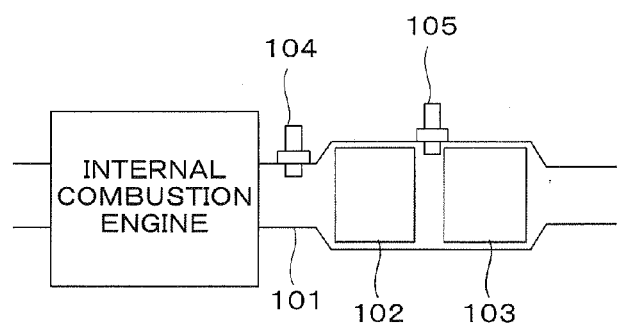
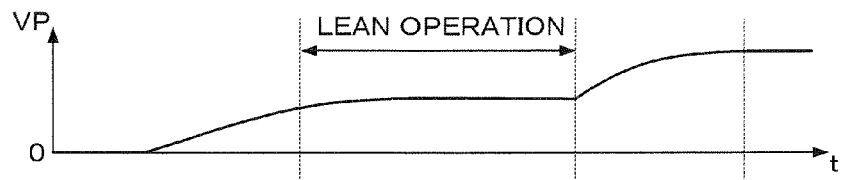
FIG. 22A
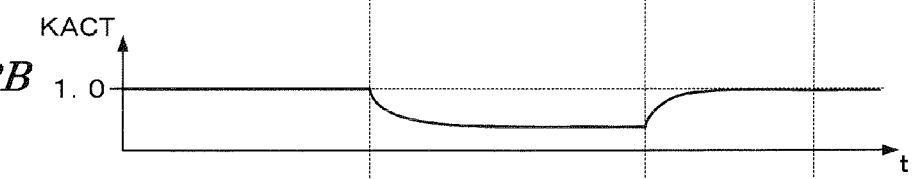
FIG. 22B
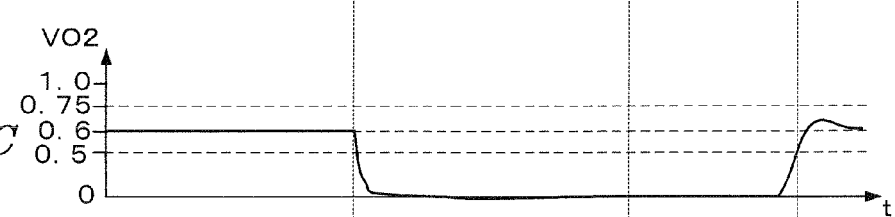
FIG. 22C
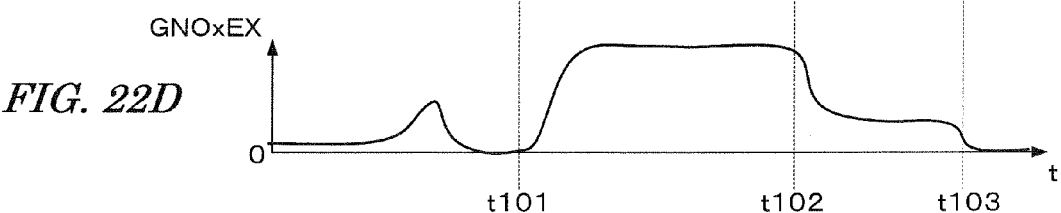
FIG. 22D

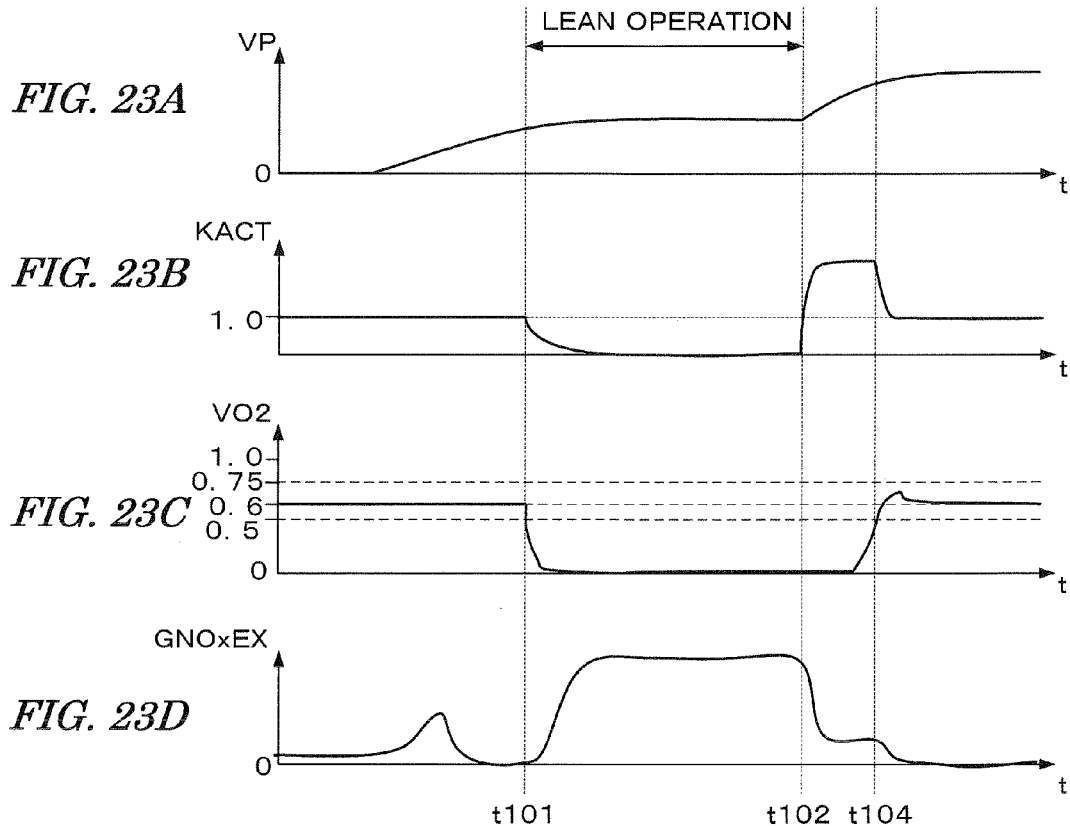

EXHAUST GAS PURIFYING APPARATUS FOR INTERNAL COMBUSTION ENGINE

BACKGROUND OF THE INVENTION

1. Field of the Invention

The present invention relates to an exhaust gas purifying apparatus for an internal combustion engine, and particularly to the exhaust gas purifying apparatus having a three-way catalyst and a selective reducing catalyst disposed in the exhaust system of the engine.

2. Description of the Related Art

FIG. 21 show a configuration of a conventional well-known internal combustion engine and an exhaust gas purifying apparatus thereof. Three way catalysts 102 and 103, an air-fuel ratio sensor 104, and a binary-type oxygen concentration sensor (referred to as "O2 sensor") are provided in an exhaust passage 101 of the internal combustion engine. In this apparatus, an air-fuel ratio feedback control is performed so that the air-fuel ratio detected by the air-fuel ratio sensor 104 coincides with a target air-fuel ratio. The three-way catalyst has a characteristic that the removing rates of carbon hydrate, carbon monoxide, and NOx are high in the state where the air-fuel ratio of an air-fuel mixture burning in the engine is controlled to the stoichiometric air-fuel ratio. Accordingly, the stoichiometric operation in which the target air-fuel ratio is set to the stoichiometric air-fuel ratio is normally performed, and the lean operation in which the target air-fuel ratio is set to an air-fuel ratio leaner than the stoichiometric air-fuel ratio is timely performed for improving the fuel efficiency. Further, by modifying the target air-fuel ratio according to the output of the oxygen concentration sensor 105, the air-fuel ratio is controlled according to the characteristic of the three-way catalyst 102.

FIG. 22 shows an example of operation of the apparatus shown in FIG. 21. Specifically, changes in a vehicle running speed VP, a detected equivalent ratio (a parameter which is proportional to the reciprocal of a detected air-fuel ratio, and takes a value of "1.0" when the air-fuel ratio is equal to the stoichiometric air-fuel ratio) KACT, an O2 sensor output VO2, and an amount GNOxEX of NOx emitted to the downstream side of the three-way catalyst 103, are shown.

When performing the lean operation, the NOx removing rate of the three-way catalyst greatly decreases. Accordingly, the NOx emission amount GNOxEX increases as shown in FIG. 22. Further, since oxygen is stored in the three-way catalyst during the lean operation (t101-t102), the three-way catalyst becomes the oxidizing state to reduce the NOx removing rate immediately after the transition from the lean operation to the stoichiometric operation (t102-t103).

Consequently, the NOx emission amount is conventionally suppressed by restricting the operating condition in which the lean operation is performed. Therefore, improvement in the fuel efficiency is insufficient due to suppressing the NOx emission amount.

On the other hand, a method for promptly eliminating the reduction in the NOx removing rate immediately after returning to the stoichiometric operation from the lean operation is known by Japanese Patent Laid-open No. H10-26040 (JP'040). According to the method shown in JP'040, the air-fuel ratio is set, immediately after the end of the lean operation, to a value which is richer than the stoichiometric air-fuel ratio, to promptly remove the oxygen stored in the three-way catalyst.

FIG. 23 shows an example of the operation to which the method shown in JP'040 is applied. The engine operating condition is the same as that of the example shown in FIG. 22.

As apparent from FIG. 23, even if using the method shown in JP'040, the increase in the NOx emission amount GNOxEX immediately after the end of the lean operation cannot be suppressed completely (FIG. 23D, t102-t104), which means that the engine operating region where the lean operation is performed cannot be greatly extended. Further, the fuel efficiency is not greatly improved since the fuel efficiency decreases due to enrichment of the air-fuel ratio (FIG. 23B, t102-t104).

Further, the fuel cut operation in which the fuel injection is stopped during deceleration is adopted for improving the fuel efficiency. However, the NOx emission amount increases immediately after the end of the fuel cut operation, since a large amount of oxygen is stored in the three-way catalyst during the fuel cut operation. Therefore, it is necessary to restrict the condition for performing the fuel cut operation, which raises a problem that the fuel efficiency cannot be sufficiently improved by the fuel cut operation.

Further, the NOx removing rate of the three-way catalyst decreases most greatly when the air-fuel ratio is set to a value in the vicinity of "16". Therefore, the method in which the air-fuel ratio is changed stepwise (very quickly) from the stoichiometric ratio to the air-fuel ratio of about "20" is adopted to suppress the increase in the NOx emission amount upon transition from the stoichiometric operation to the lean operation. However, according to this control method, there is a problem that the engine output torque greatly changes due to the rapid change in the air-fuel ratio, which consequently degrades drivability of the engine. Therefore, execution frequency of the lean operation is reduced in order to cope with this problem.

SUMMARY OF THE INVENTION

The present invention is made contemplating the above-described points, and an objective of the present invention is to provide an exhaust gas purifying apparatus for an internal combustion engine, which can surely prevent the increase in the NOx emission amount due to the lean operation or the fuel cut operation, to sufficiently suppress the NOx emission amount as well as to improve fuel efficiency.

To attain the above objective, the present invention provides an exhaust gas purifying apparatus for an internal combustion engine, including first and second catalysts (7, 8), reducing-agent supply means, air-fuel ratio control means, and determining means. The first catalyst (7), which is provided in an exhaust passage (6) of the engine, can remove NOx in exhaust gases from the engine when an air-fuel ratio of an air-fuel mixture burning in the engine is in the vicinity of the stoichiometric ratio. The second catalyst (8), which is provided downstream of the first catalyst (7), can remove NOx in the exhaust gases using a reducing agent. The reducing-agent supply means supplies the reducing agent to the second catalyst, and the air-fuel ratio control means controls the air-fuel ratio. The determining means determines an execution condition of a lean operation in which the air-fuel ratio is set to a lean air-fuel ratio which is leaner than the stoichiometric ratio. When switching the air-fuel ratio from an air-fuel ratio in the vicinity of the stoichiometric ratio to the lean air-fuel ratio, the air-fuel ratio control means controls the air-fuel ratio to a rich air-fuel ratio which is richer than the stoichiometric ratio, during a lean transition period (t2-t3) from the time the execution condition is satisfied, and controls the air-fuel ratio to the lean air-fuel ratio after the lean transition period has elapsed.

With this configuration, when switching the air-fuel ratio from the air-fuel ratio in the vicinity of the stoichiometric ratio to the lean air-fuel ratio, the air-fuel ratio is controlled to the rich air-fuel ratio which is richer than the stoichiometric ratio, during the lean transition period from the time the lean operation execution condition is satisfied, and the air-fuel ratio is controlled to the lean air-fuel ratio after the lean transition period has elapsed. The desired NOx removing rate cannot be obtained by the second catalyst immediately after starting the supply of the reducing agent, but the desired NOx removing rate is obtained after a little delay from the time of starting the supply of the reducing agent. Therefore, by controlling the air-fuel ratio to the rich air-fuel ratio during the lean transition period, the reducing agent can be generated in the first catalyst to improve the NOx removing rate of the second catalyst. Consequently, the increase in the NOx emission amount can be suppressed immediately after switching the air-fuel ratio to the lean air-fuel ratio.

Preferably, The exhaust gas purifying apparatus further includes an oxygen concentration sensor (15) disposed downstream of the first catalyst (7), for detecting an oxygen concentration in the exhaust gases. The air-fuel ratio control means performs the air-fuel ratio control so that the output (VO2) of the oxygen concentration sensor coincides with a first predetermined value (VO2ST) when controlling the air-fuel ratio to an air-fuel ratio in the vicinity of the stoichiometric ratio, and the air-fuel ratio control means performs the air-fuel ratio control during the lean transition period so that the output (VO2) of the oxygen concentration sensor coincides with a second predetermined value (VO2NH3) which corresponds to an oxygen concentration less than the oxygen concentration corresponding to the first predetermined value (VO2ST).

Preferably, the second predetermined value (VO2NH3) is set to a value corresponding to an oxygen concentration which is higher than the minimum oxygen concentration corresponding to the rich-side saturation value (the maximum output value VO2MAX) of the oxygen concentration sensor output (VO2ST<VO2NH3<VO2MAX).

With this configuration, the air-fuel ratio control is performed so that the oxygen concentration sensor output coincides with the first predetermined value when controlling the air-fuel ratio to an air-fuel ratio in the vicinity of the stoichiometric ratio, and the air-fuel ratio control is performed during the lean transition period so that the oxygen concentration sensor output coincides with the second predetermined value which corresponds to the oxygen concentration less than that corresponding to the first predetermined value. Accordingly, the reducing agent is generated in the first catalyst during the lean transition period, and the generated reducing agent is supplied to the second catalyst. Therefore, the supply amount of the reducing agent from the reducing-agent supply means can be reduced, thereby greatly reducing frequency of charging the reducing agent to the reducing agent storage device. Further, the air-fuel ratio control is performed according to the oxygen sensor output, which prevents the air-fuel ratio from becoming excessively rich, and suppresses degradation of the exhaust gas purifying performance of the first catalyst during the lean transition period. Consequently, good exhaust characteristic can be maintained.

Preferably, the reducing-agent supply means supplies the reducing agent during the lean transition period (t2-t3).

With this configuration, when switching the air-fuel ratio from an air-fuel ratio in the vicinity of the stoichiometric ratio to the lean air-fuel ratio, the reducing agent is supplied to the second catalyst during the lean transition period. By supplying the reducing agent to the second catalyst during the lean transition period, the NOx removing rate of the second catalyst can be enhanced to the desired level at the beginning of the lean operation, thereby suppressing the increase in the NOx emission amount immediately after switching the air-fuel ratio to the lean air-fuel ratio.

Preferably, the second catalyst (8) is able to store the reducing agent, and the lean transition period ends at the time an amount (STNH3) of the reducing agent stored in the second catalyst (8) reaches a predetermined storage amount (STNH3SL).

With this configuration, the lean transition period is terminated at the time the amount of the reducing agent stored in the second catalyst reaches the predetermined storage amount. Accordingly, the NOx emission amount can surely be suppressed immediately after switching the air-fuel ratio to the lean air-fuel ratio.

Preferably, the predetermined storage amount (STNH3SL) is set to a value which is equal to or greater than 15% of a maximum amount (STNH3MAX) of the reducing agent which is storable in the second catalyst (8).

With this configuration, the predetermined storage amount is set to a value which is equal to or greater than 15% of the maximum storable amount of the reducing agent in the second catalyst. The desired NOx removing rate of the second catalyst is obtained in the condition where the stored reducing agent amount becomes equal to or greater than 15% of the maximum storable amount. Therefore, by setting the predetermined storage amount to the value equal to or greater than 15% of the maximum storable amount, the desired NOx removing rate can surely be obtained at the beginning of the lean operation. Further, the maximum storable amount of the reducing agent changes depending on the temperature of the second catalyst. Therefore, by setting the predetermined amount using a ratio with respect to the maximum storable amount, the good NOx removing rate can be maintained even when the catalyst temperature changes.

Preferably, the air-fuel ratio control means gradually changes the air-fuel ratio to the lean air-fuel ratio after the lean transition period has elapsed.

With this configuration, the air-fuel ratio is controlled so as to gradually shift to the lean air-fuel ratio after the lean transition period has elapsed. Accordingly, the torque change due to a stepwise change in the air-fuel ratio does not occur, to improve drivability of the engine. It is to be noted that the word "stepwise" is used in the present specification for meaning a quick step-like change by a comparatively large amount.

Preferably, the exhaust gas purifying apparatus further includes a reducing-agent concentration sensor (17) disposed downstream of the second catalyst (8) for detecting a concentration (NH3CONS) of the reducing agent in the exhaust gases. The reducing-agent supply means performs the supply of the reducing agent so that the concentration (NH3CONS) of the reducing agent detected by the reducing-agent concentration sensor (17) becomes greater than "0".

With this configuration, the supply of the reducing agent is performed so that the concentration of the reducing agent detected on the downstream side of the second catalyst becomes greater than "0". Accordingly, the amount of the reducing agent stored in the second catalyst can always be maintained at the maximum value during the lean operation, which makes it possible to shorten the lean transition period. Consequently, the fuel efficiency can be improved due to extension of the lean operation period, for example in the operating condition where switching between the lean operation and the stoichiometric operation is frequently performed.

Preferably, the exhaust gas purifying apparatus further includes estimated reducing-agent stored amount calculating means for calculating an estimated reducing-agent stored amount (STNH3) which is an estimated value of an amount of the reducing agent stored in the second catalyst (8). The lean transition period is set according to the estimated reducing-agent stored amount (STNH3), and the air-fuel ratio control means performs a reducing-agent generation control in which the air-fuel ratio is controlled so that the output (VO2) of the oxygen concentration sensor coincides with a predetermined value (VO2NH3) which enables generation of the reducing agent in the first catalyst (7) when controlling the air-fuel ratio to a value in the vicinity of the stoichiometric ratio.

With this configuration, when controlling the air-fuel ratio to a value in the vicinity of the stoichiometric ratio, the reducing agent generation control is performed wherein the air-fuel ratio is controlled so that the output of the oxygen concentration sensor coincides with the predetermined value which enables generation of the reducing agent in the first catalyst, and the estimated reducing agent stored amount of the second catalyst is calculated. Further, when switching the air-fuel ratio from an air-fuel ratio in the vicinity of the stoichiometric ratio to the lean air-fuel ratio, the air-fuel ratio is changed to the lean air-fuel ratio after the lean transition period, which is set according to the estimated reducing agent stored amount, has elapsed from the time the lean operation execution condition is satisfied. Therefore, it is possible to immediately start the lean operation if the estimated reducing agent stored amount is sufficient, i.e., the reducing agent stored amount of the second catalyst is estimated to reach the desired amount. Further, if the reducing agent stored amount is insufficient for the desired amount, it is possible to start the lean operation when the amount of the reducing agent necessary for reaching the desired amount has stored in the second catalyst. Consequently, the reducing agent supply amount can be reduced, thereby reducing frequency of charging the reducing agent to the reducing agent storage device.

Preferably, when switching the air-fuel ratio from the lean air-fuel ratio to an air-fuel ratio which is in the vicinity of the stoichiometric ratio or to the rich air-fuel ratio, or when switching a fuel cut operation in which the fuel supply to the engine is stopped, to a normal operation in which fuel is supplied to the engine, the reducing-agent supply means supplies the reducing agent during a rich transition period (t5-t6) starting from the time of switching the air-fuel ratio or the time of terminating the fuel cut operation.

With this configuration, when switching the air-fuel ratio from the lean air-fuel ratio to an air-fuel ratio in the vicinity of the stoichiometric ratio or to the rich air-fuel ratio, or when switching the fuel cut operation to the normal operation (terminating the fuel cut operation), the reducing agent is supplied to the second catalyst during the rich transition period from the time of switching the air-fuel ratio or the time of terminating the fuel cut operation. Therefore, if the oxygen stored amount of the first catalyst increases during the lean operation or the fuel cut operation to reduce the NOx removing rate of the first catalyst, the NOx removal is performed by the second catalyst during the rich transition period. Accordingly, reduction effect of the NOx emission amount can be obtained immediately after the lean operation or the fuel cut operation. Consequently, the engine operating region where the lean operation is performed can be extended to improve the fuel efficiency.

Preferably, the rich transition period ends at the time the output (VO2) of the oxygen concentration sensor (15) reaches a predetermined output value (VO2JD) corresponding to an air-fuel ratio which is richer than the lean air-fuel ratio.

With this configuration, the rich transition period ends at the time the output of the oxygen concentration sensor reaches the predetermined output value corresponding to the air-fuel ratio which is richer than the lean air-fuel ratio, i.e., the reducing agent supply is terminated after the NOx removing rate of the first catalyst has surely restored. Therefore, increase in the NOx emission amount can surely be prevented.

Preferably, the air-fuel ratio control means gradually reduces the air-fuel ratio when switching the air-fuel ratio from the lean air-fuel ratio to the stoichiometric ratio or the rich air-fuel ratio.

With this configuration, when switching the air-fuel ratio from the lean air-fuel ratio to the stoichiometric ratio or the air-fuel ratio richer than the stoichiometric ratio, the air-fuel ratio is gradually reduced. Accordingly, the torque change due to a stepwise change in the air-fuel ratio does not occur, which improves drivability of the engine.

Preferably, the reducing-agent supply means performs the supply of the reducing agent so that the concentration (NH3CONS) of the reducing agent detected by the reducing-agent concentration sensor becomes greater than "0".

With this configuration, the supply of the reducing agent is performed so that the reducing agent concentration detected on the downstream side of the second catalyst becomes greater than "0". Accordingly, the reducing agent stored amount of the second catalyst can always be maintained at the maximum value in the lean operation and the rich transition period, which makes it possible to immediately start the lean operation. Consequently, the fuel efficiency can be improved with extension of the lean operation period, for example in the operating condition wherein the switching between the lean operation and the stoichiometric operation is frequently performed.

Preferably, the reducing-agent supply means supplies the reducing agent by an amount which is necessary for reducing NOx in the exhaust gases discharged from the first catalyst, during the rich transition period.

With this configuration, the reducing agent is supplied by an amount which is necessary for reducing NOx in the exhaust gases discharged from the first catalyst, during the rich transition period. That is, the reducing agent is supplied by an amount suitable for reducing NOx which is not reduced in the first catalyst. Consequently, the effect of decreasing the NOx emission amount immediately after the fuel cut operation can be attained by a minimum amount of the reducing agent.

Preferably, the reducing-agent supply means stops the supply of the reducing agent during the fuel cut operation. Accordingly, an amount of the used reducing agent can be reduced.

Preferably, the exhaust gas purifying apparatus further includes intake air amount detecting means (11) for detecting an intake air amount of the engine and an air-fuel ratio sensor (14) disposed upstream of the first catalyst (7), for detecting the air-fuel ratio. The air-fuel ratio control means calculates a target air-fuel ratio according to an amount of fuel supplied to the engine and the detected intake air amount, and corrects the amount of fuel so that the detected air-fuel ratio coincides with the target air-fuel ratio.

With this configuration, the target air-fuel ratio is calculated according to the amount of fuel supplied to the engine and the detected intake air amount, and the air-fuel ratio is controlled by correcting the amount of fuel so that the detected air-fuel ratio coincides with the target air-fuel ratio. The fuel supply amount and the detected intake air amount does not change stepwise. Therefore, the air-fuel ratio is continuously (gradually) changed.

BRIEF DESCRIPTION OF THE DRAWINGS

FIGS. 12A and 12B show a map and a table which are referred to in the process of FIG. 11;

FIG. 13 is a flowchart of a calculation process in the NH3 generation amount estimation block shown in FIG. 10;

FIG. 21 shows a configuration of a conventional exhaust gas purifying apparatus; and FIGS. 22A-22D and 23A-23D show time charts for illustrating a conventional air-fuel ratio control.

DETAILED DESCRIPTION OF THE PREFERRED EMBODIMENTS

Preferred embodiments of the present invention will now be described with reference to the drawings.

Figure 1:
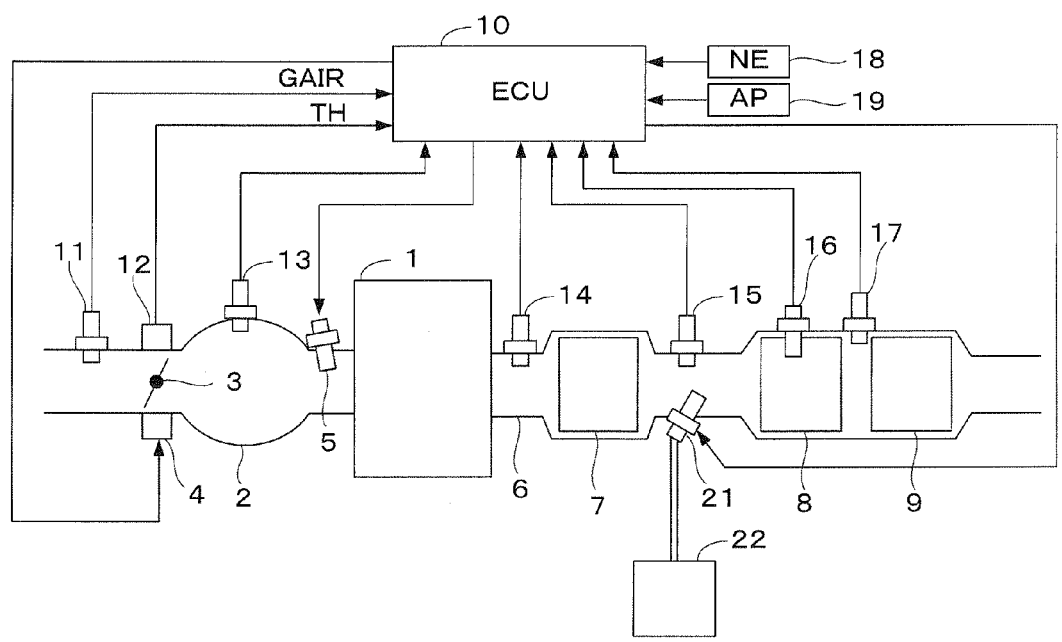
FIG. 1 is a schematic diagram showing a configuration of an internal combustion engine and a control system therefor according to one embodiment of the present invention.

FIG. 1 is a schematic diagram showing a configuration of an internal combustion engine and a control system therefor according to an embodiment of the present invention. An internal combustion engine 1 (hereinafter referred to merely as "engine") is a spark-ignition engine having, for example, four cylinders. The engine 1 has an intake pipe 2 provided with a throttle valve 3. An actuator 4 for actuating the throttle valve 3 is connected to the throttle valve 3, and the operation of the actuator 4 is controlled by an electronic control unit 10 (hereinafter referred to as "ECU"). The throttle valve 3 is provided with a throttle valve opening sensor 12 for detecting an opening TH of the throttle valve 3, and an intake air flow rate sensor 11 for detecting an intake air flow rate GAIR [g/sec] is disposed upstream of the throttle valve 3. The detection signals of these sensors are supplied to the ECU 10.

A fuel injection valve 5 is provided for each cylinder at a position slightly upstream of an intake valve (not shown). Each injection valve is connected to a fuel pump (not shown) and electrically connected to the ECU 10. A valve opening period of the fuel injection valve 5 is controlled by a signal from the ECU 10.

An intake pressure sensor 13 for detecting an intake pressure PBA is provided downstream of the throttle valve 3. Further, an intake air temperature sensor for detecting an intake air temperature TA and an engine coolant temperature sensor for detecting an engine coolant temperature TW (both sensors are not shown) are mounted on the engine 1. The detection signals of these sensors are supplied to the ECU 10.

An exhaust passage 6 of the engine 1 is provided with a three-way catalyst 7, and selective reduction catalysts (hereinafter referred to as "SCR catalyst") 8 and 9. These catalyst 7 to 9 are arranged in this order from the upstream side. The three-way catalyst 7 has an oxygen storage capacity, and exhibits the optimum exhaust gas purifying performance in the condition where an air-fuel ratio of an air-fuel mixture which burns in the engine 1 is set to an air-fuel ratio in the vicinity of the stoichiometric ratio. The SCR catalysts 8 and 9 reduce NOx in exhaust gases under existence of reducing agents, and are configured so that the SCR catalysts 8 and 9 can store ammonia ("$NH_3$", hereinafter described as "NH3") which serves as a reducing agent. It is to be note that, in the following description, an amount of the reducing agent stored in the SCR catalyst 8 is referred to as "storage amount", and the maximum storage amount that the SCR catalyst 8 can store is referred to as "storage capacity".

A linear air-fuel ratio sensor 14 (hereinafter referred to as "LAF sensor 14") is mounted on the upstream side of the three-way catalyst 7. The LAF sensor 14 detects the air-fuel ratio of the air-fuel mixture which burns in the engine 1 by detecting a concentration of oxygen in the exhaust gases. A binary type oxygen concentration sensor 15 (hereinafter referred to as "O2 sensor 15") is mounted at a position between the three-way catalyst 7 and the SCR catalyst 8. The O2 sensor 15 has a characteristic such that its output rapidly changes in the vicinity of the stoichiometric ratio. Specifically, the O2 sensor 15 outputs a high level signal (a rich saturation value VO2MAX≈1.0V) when the oxygen concentration O2CONS is lower than a stoichiometric oxygen concentration O2CONSST (i.e., when the air-fuel ratio is richer than the stoichiometric ratio), and outputs a low level signal (a lean saturation value VO2MIN≈0V) when the oxygen concentration O2CONS is higher than the stoichiometric oxygen concentration O2CONSST (i.e., when the air-fuel ratio is leaner than the stoichiometric ratio). The O2 sensor 15 can accurately detect the oxygen concentration (air-fuel ratio) that optimizes the exhaust gas purifying characteristic of the three-way catalyst 7.

An NH3 injection valve 21 for injecting an NH3 gas is provided between the three-way catalyst 7 and the SCR catalyst 8, and the operation of the NH3 injection valve 21 is controlled by the ECU 10. The NH3 gas is supplied to the NH3 injection valve 21 from an NH3 storage device 22. It is preferable that the NH3 storage device 22 contains an adsorbent for adsorbing NH3 and stores NH3 by adsorption of the adsorbent.

The SCR catalyst 8 is provided with an SCR catalyst temperature sensor 16 for detecting an SCR catalyst temperature TSCR, and an NH3 concentration sensor 17 for detecting an NH3 concentration NH3CONS in the exhaust gases is disposed between the SCR catalysts 8 and 9. The detection signals of the sensors 14-17 are supplied to the ECU 10.

An engine rotational speed sensor 18 and an accelerator sensor 19 are connected to the ECU 10. The engine rotational speed sensor 18 detects an rotational speed NE of the engine 1, and the accelerator sensor 19 detects a depression amount AP of an accelerator of the vehicle driven by the engine 1 (hereinafter referred to as "accelerator operation amount AP"). The detection signals of these sensors are supplied to the ECU 10. The engine rotational speed sensor 18 supplies a TDC pulse which is generated in synchronism with the timing at which the piston of each cylinder of engine 1 is located at the top dead center.

The ECU 10 includes an input circuit, a central processing unit (hereinafter referred to as "CPU"), a memory circuit, and an output circuit. The input circuit performs various functions, including shaping the waveforms of input signals from various sensors, correcting the voltage levels of the input signals to a predetermined level, and converting analog signal values into digital values. The memory circuit preliminarily stores various operating programs to be executed by the CPU and stores the results of computations, or the like, by the CPU. The output circuit supplies drive signals to the fuel injection valves 5, NH3 injection valve 21, actuator 4, and the like.

The ECU 10 performs the fuel injection control (air-fuel ratio control) with the fuel injection valve 5 according to an engine operating condition, and performs the NH3 injection control for supplying a suitable amount of NH3 to the SCR catalyst 8. Further, the ECU 10 performs the intake air amount control wherein the actuator 4 is driven so that the detected throttle valve opening TH coincides with a target opening THCMD calculated in the fuel injection control.

FIGS. 2A-2I show time charts for illustrating an outline of the air-fuel ratio control and the NH3 injection control in this embodiment. FIGS. 2A-2I respectively show changes in a vehicle speed VP of the vehicle driven by the engine 1, catalyst temperatures (TTWC: three-way catalyst temperature, TSCR: SCR catalyst temperature), a detected equivalent ratio KACT (a target equivalent ratio KCMD and a basic target equivalent ratio KCMDBS are also shown), an intake air amount GCYLACT of the engine 1, the O2 sensor output VO2, an NH3 injection amount GNH3, an estimated NH3 storage amount STNH3 (an estimated NH3 storage capacity STNH3MAX is also shown), a detected NH3 concentration NH3CONS, and a NOx emission amount GNOxEX (on the downstream side of the SCR catalyst 9). The estimated NH3 storage amount STNH3 is an estimated value of the NH3 storage amount of the SCR catalyst 8. The shown example corresponds to the state where the vehicle starts running after the cold start of the engine 1, and the vehicle speed is accelerated further.

The NOx emission amount GNOxEX increases until time t1, since the three-way catalyst 7 and the SCR catalyst 8 are not activated. At time t1, the three-way catalyst 7 becomes activated. Accordingly, the NOx emission amount GNOxEX decreases thereafter. At time t2, the execution condition of the lean operation is satisfied. Then, the air-fuel ratio is changed to an air-fuel ratio which is a little richer than the stoichiometric ratio, and the injection of NH3 is started. The basic target equivalent ratio KCMDBS shown in FIG. 2C is set according to the engine operating condition, and indicates that the lean operation is available during the period from time t2 to time t5. By setting the air-fuel ratio to the air-fuel ratio which is a little richer than the stoichiometric ratio, NH3 is generated in the three-way catalyst 7. Accordingly, an amount of NH3 injected by the NH3 injection valve 21 can be reduced.

The period from time t2 to time t3 corresponds to the lean transition period, during which the NH3 storage amount (STNH3) increases to reach the level which enables the NOx removing immediately before time t3. Accordingly, the lean operation is started at time t3, which makes it possible to attain a sufficient NOx removing rate from the beginning of the lean operation.

Since NH3 is not generated in the three-way catalyst 7 during the lean operation, a comparatively large amount of NH3 is injected until time t4 at which the estimated NH3 storage amount STNH3 reaches the estimated NH3 storage capacity STNH3MAX. During the period of performing the NH3 injection, the NH3 injection amount GNH3 is controlled so that the detected NH3 concentration NH3CONS coincides with its target value NH3CONSTRGT.

When the basic target equivalent ratio KCMDBS changes to "1.0", the injection of NH3 is continued during a rich transition period (time t5-t6). The O2 sensor output VO2 reaches an NH3 injection stop threshold value VO2JD at time t6, which indicates that the oxygen stored in the three-way catalyst 7 has removed. Therefore, the injection of NH3 is stopped at time t6. According to this control, the increase in the NOx emission amount immediately after the end of the lean operation can surely be prevented.

As shown in FIG. 2C, the target equivalent ratio KCMD is gradually changed after time t3 at which the lean transition period ends, and also after time t5 at which the lean operation ends. Accordingly, sudden change in the engine output torque can be prevented.

Figure 3:
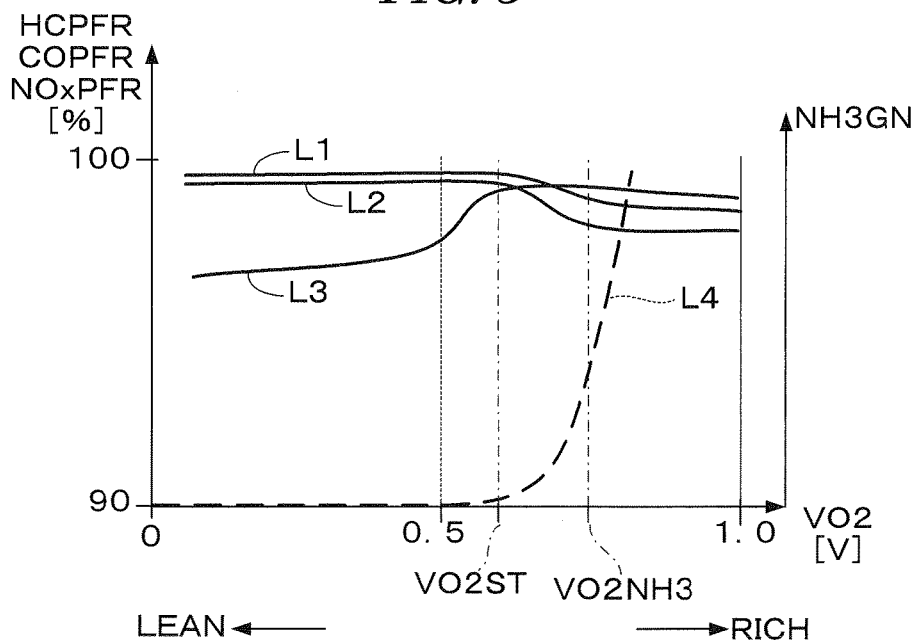
FIG. 3 illustrates a purifying characteristic and an NH3 generation characteristic of a three-way catalyst.

FIG. 3 shows relationships between the O2 sensor output VO2, and a CO removing rate COPFR (solid line L1), an HC (hydrocarbon) removing rate HCPFR (solid line L2), a NOx removing rate NOxPFR (solid line L3), and an NH3 generation amount NH3GN (dashed line L4) of the three-way catalyst 7. In FIG. 3, "VO2ST" indicates an O2 sensor output corresponding to the stoichiometric operation (hereinafter referred to as "stoichiometric operation output VO2ST"), and "VO2NH3" indicates an O2 sensor output suitable for generating NH3 (hereinafter referred to as "NH3 generating output VO2NH3"). In the above-described lean transition period (t2-t3), the target equivalent ratio KCMD is set so that the VO2 sensor output coincides with the NH3 generating output VO2NH3.

Figure 4:
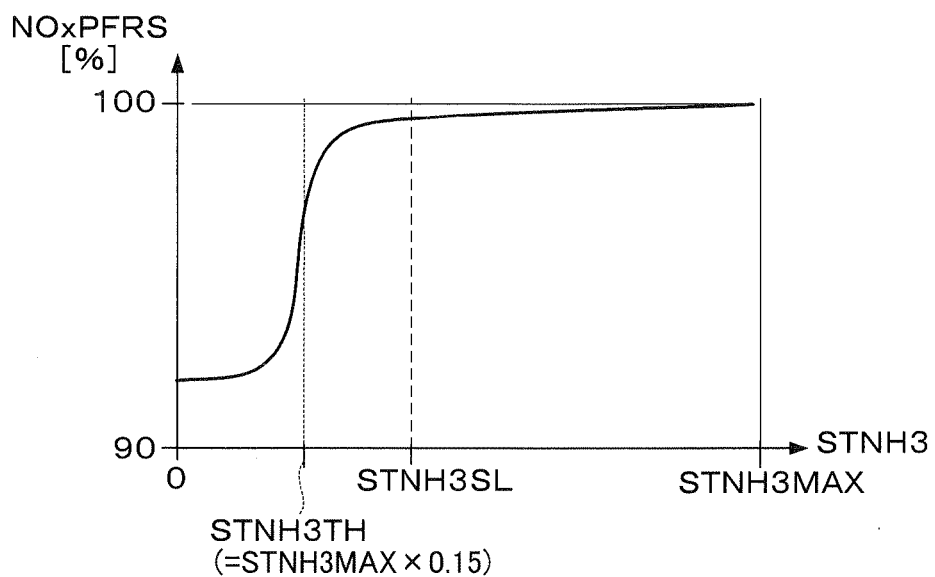
FIG. 4 illustrates a NOx removing characteristic of a selective reduction catalyst.

FIG. 4 shows a relationship between the estimated NH3 storage amount STNH3 of the SCR catalyst 8 and a NOx removing rate NOxPFRS of the SCR catalyst 8. As shown in FIG. 4, the NOx removing rate NOxPFRS sharply changes in the vicinity of the storage amount threshold value STMH3TH corresponding to about 15% of the estimated NH3 storage capacity STNH3MAX. Therefore in this embodiment, a lean switching determination threshold value STNH3SL for determining the end timing of the lean transition period is set to a value which is a little greater than the storage amount threshold value STMH3TH as shown in FIG. 4, thereby making it possible to surely remove NOx from the beginning of the lean operation.

Figure 5:
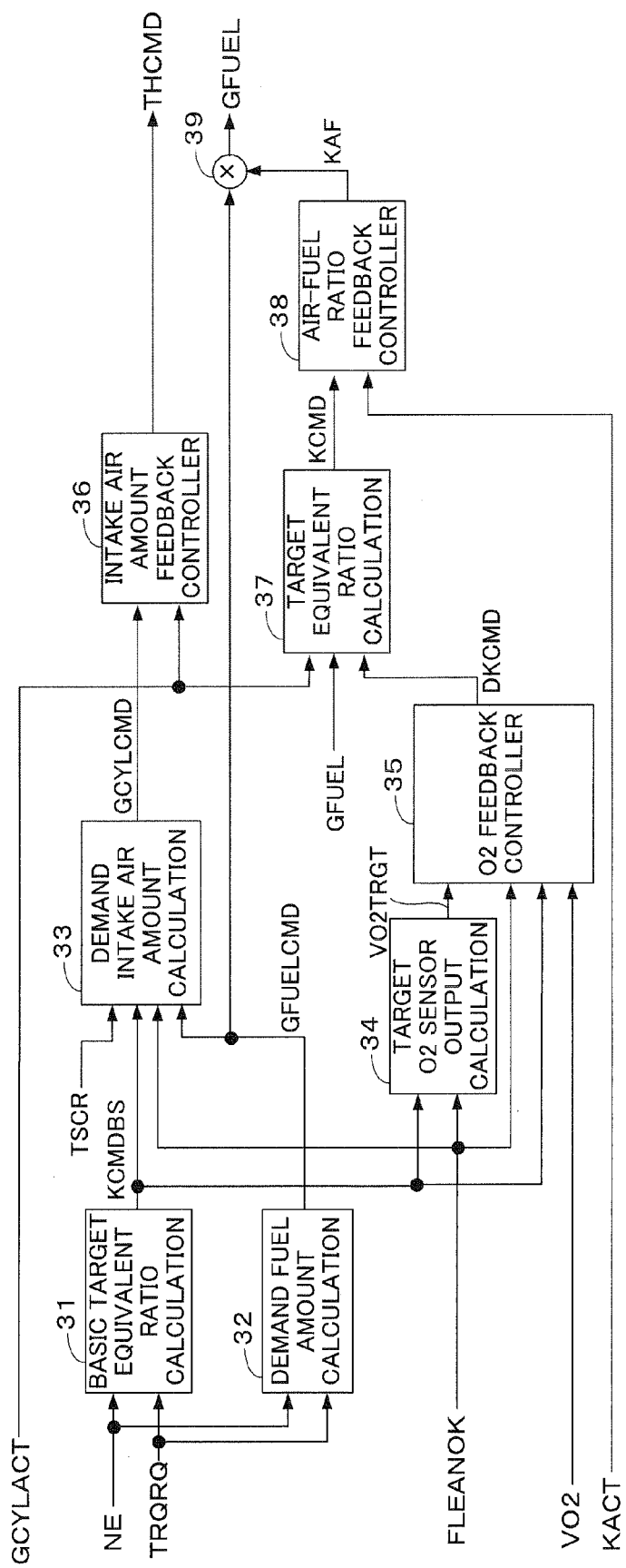
FIG. 5 is a block diagram showing a configuration of a fuel injection control module.

FIG. 5 is a block diagram showing a configuration of a module for performing the fuel injection control including the intake air amount control. The function of each block shown in FIG. 5 is realized by the calculation process executed by the CPU in the ECU 10.

The fuel injection control module of FIG. 5 includes a basic target equivalent ratio calculation block 31, a demand fuel amount calculation block 32, a demand intake air amount calculation block 33, a target O2 sensor output calculation block 34, an O2 feedback controller 35, an intake air amount feedback controller 36, a target equivalent ratio calculation block 37, an air-fuel ratio feedback controller 38, and a multiplying block 39.

Figure 6A:
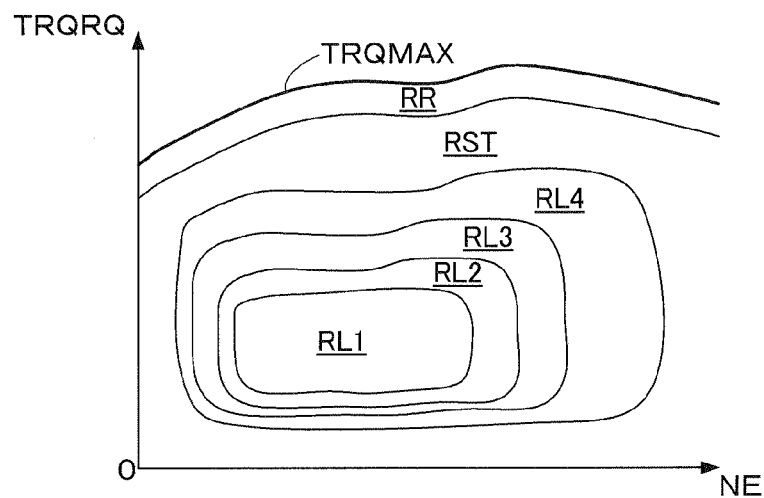
FIGS. 6A and 6B show the maps referred to in the calculation process of the basic target equivalent ratio calculation block and the demand fuel amount calculation block shown in FIG. 5.

The basic target equivalent ratio calculation block 31 retrieves a KCMDBS map shown in FIG. 6A according to the engine rotational speed NE and a demand torque TRQRQ of the engine 1, to calculate a basic target equivalent ratio KCMDBS. The demand torque TRQRQ is calculated according to the accelerator pedal operation amount AP, and set so as to be substantially proportional to the accelerator pedal operation amount AP.

On the KCMDBS map, values which are less than "1.0" are set with respect to the lean operating regions RL1-RL4, "1.0" is set with respect to the stoichiometric operation region RST, and values which are greater than "1.0" are set with respect to the rich operating region RR. The map values KCMDL1-KCMDL4 corresponding to the regions RL1-RL4 satisfy the relationship of "KCMDL1<KCMDL2<KCMDL3<KCMDL4". The basic target equivalent ratio KCMDBS is set to a value which is less than "1.0" in the regions where the lean operation execution condition is satisfied. It is to be noted that "TRQMAX" shown in FIG. 6A indicates the maximum output torque depending on the engine rotational speed NE.

In addition, when changing the basic target equivalent ratio KCMDBS, the limit process of the change amount per unit time period is performed so that the basic target equivalent ratio KCMDBS gradually changes. For example, when the engine operating condition shifts from the region RST to the region RL4, the basic target equivalent ratio KCMDBS is not changed stepwise from "1.0" to KCMDL4, but is controlled so as to gradually change to reach KCMDL4 (refer to FIG. 2C).

Figure 6B:
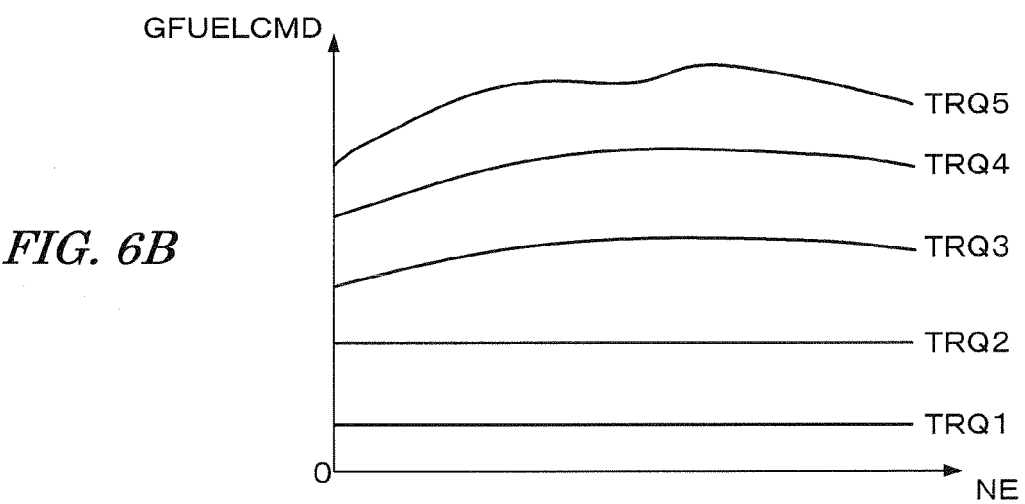

The demand fuel amount calculation block 32 retrieves a GFUELCMD map shown in FIG. 6B according to the engine rotational speed NE and the demand torque TRQRQ, to calculate the demand fuel amount GFUELCMD. The five lines shown in FIG. 6B respectively correspond to predetermined demand torques TRQRQ1, TRQRQ2, TRQRQ2, TRQRQ3, TRQRQ4, and TRQRQ5, which satisfy the relationship of "TRQRQ1<TRQRQ2<TRQRQ2<TRQRQ3<TRQRQ4<TRQRQ5".

Figure 7:
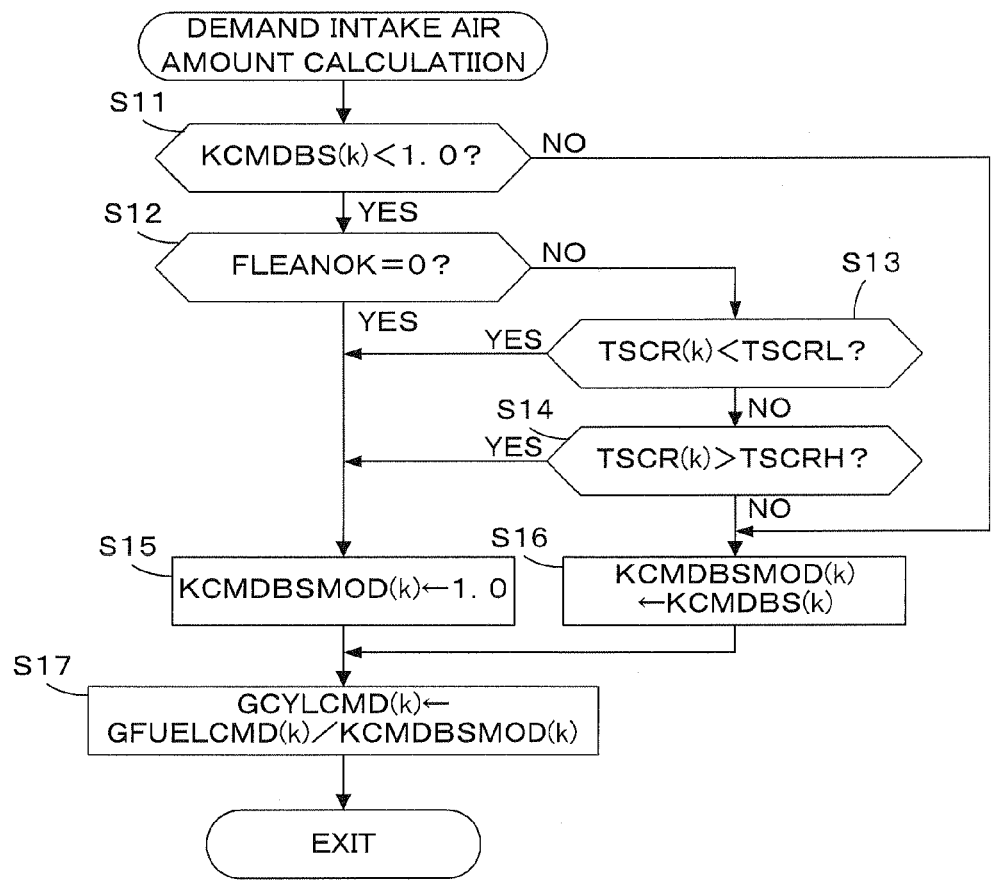
FIG. 7 is a flowchart of a calculation process in the demand intake air amount calculation block shown in FIG. 5.

The demand intake air amount calculation block 33 calculates a demand intake air amount GCYLCMD, which is an amount of air to be supplied to the engine 1, according to the basic target equivalent ratio KCMDBS, the demand fuel amount GFUELCMD, a lean operation permission flag FLEANOK, and the SCR catalyst temperature TSCR (refer to FIG. 7). The lean operation permission flag FLEANOK is set to "1" in the NH3 injection control module described below, when the lean operation can be performed, i.e., when the estimated NH3 storage amount STNH3, which is an estimated value of an amount of NH3 stored in the SCR catalyst 8, is greater than a lean switching determination value STMH3SL (refer to FIG. 14, steps S69 and S70).

The intake air amount feedback controller 36 calculates the target opening THCMD of the throttle valve 3 so that the detected intake air amount GCYLACT coincides with the demand intake air amount GCYLCMD. As the algorithm of this feedback control, known feedback control algorithms, such as the sliding mode control algorithm, the PID (proportional, integral, and differential) control algorithm, and the like are applicable. It is preferable to calculate the target opening THCMD combining a feedback control amount calculated according to a difference between the detected intake air amount GCYLACT and the demand intake air amount GCYLCMD, with a feedforward control amount calculated according to the demand intake air amount GCYLCMD.

The detected intake air amount GCYLACT is obtained by converting the intake air flow rate GAIR detected by the intake air flow rate sensor 11 to an intake air amount per period of the TDC pulse generation.

Figure 8:
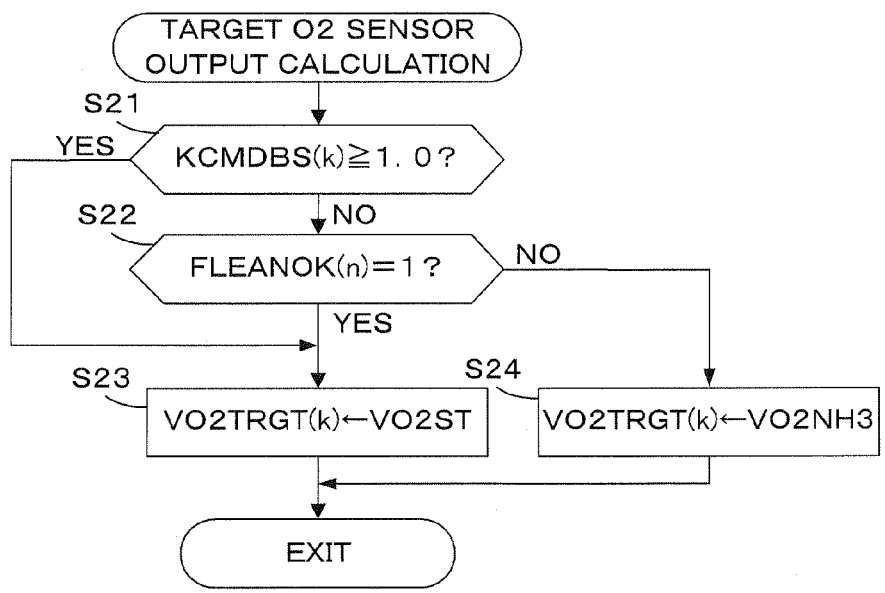
FIG. 8 is a flowchart of a calculation process in the target O2 sensor output calculation block shown in FIG. 5.

The target O2 sensor output calculation block 34 calculates a target O2 sensor output VO2TRGT, which is a target value of the O2 sensor output VO2, according to the basic target equivalent ratio KCMDBS and the lean operation permission flag FLEANOK (refer to FIG. 8).

Figure 9:
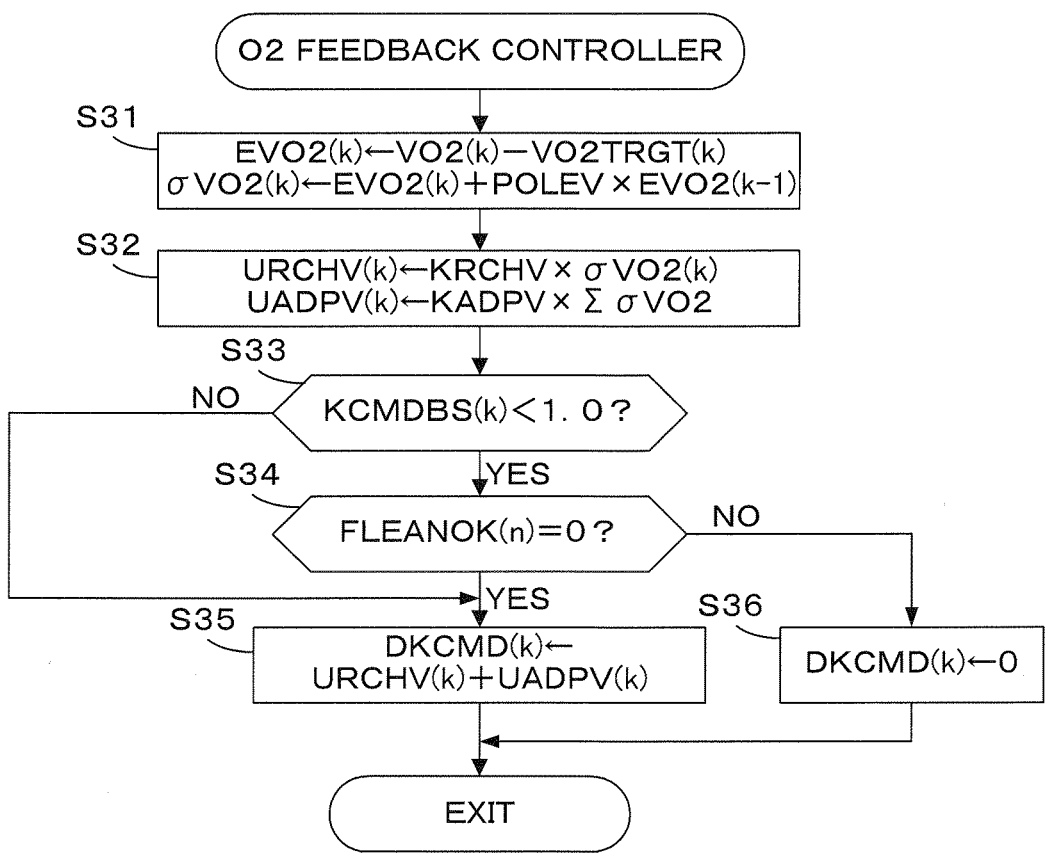
FIG. 9 is a flowchart of a calculation process in the O2 feedback controller shown in FIG. 5.

The O2 feedback controller 35 calculates a target equivalent ratio modification amount DKCMD so that the O2 sensor output VO2 coincides with the target O2 sensor output VO2TRGT (refer to FIG. 9). When calculating the target equivalent ratio modification amount DKCMD, the basic target equivalent ratio KCMDBS and the lean operation permission flag FLEANOK are referred to.

The target equivalent ratio calculation block 37 applies the detected intake air amount GCYLACT(k), the fuel injection amount GFUEL(k−1) (the preceding calculated value), and the target equivalent ratio modification amount DKCMD(k) to the following equation (1), to calculate the target equivalent ratio KCMD(k). "k" is a discrete time digitized with the TDC pulse generation period. It is to be noted that "(k)" indicative of the present value may sometimes be omitted.

$$KCMD(k) = GFUEL(k-1)/GCYLACT(k) + DKCMD(k) \quad (1)$$

The air-fuel ratio feedback controller 38 calculates an air-fuel ratio correction coefficient KAF using the sliding mode control algorithm so that a detected equivalent ratio KACT, which is obtained by converting the air-fuel ratio detected by the LAF sensor 14 to an equivalent ratio, coincides with the target equivalent ratio KCMD.

Specifically, the detected equivalent ratio KACT(k) and the target equivalent ratio KCMD(k) are applied to the following equation (2) to calculate a deviation E$\phi$(k), and the deviation E$\phi$(k) is applied to the following equation (3) to calculate a switching function value $\sigma\phi$(k). Subsequently, the switching function value $\sigma\phi$(k) is applied to the following equations (4) and (5) to calculate a reaching law control term URCH$\phi$(k) and an adaptive law control term UADP$\phi$(k). Then the reaching law control term URCH$\phi$(k) and the adaptive law control term UADP$\phi$(k) are applied to the following equation (6), to calculate the air-fuel ratio correction coefficient KAF(k).

$$E\phi(k) = KACT(k) - KCMD(k) \quad (2)$$

$$\sigma\phi(k) = E\phi(k) + POLE\phi \times E\phi(k-1) \quad (3)$$

$$URCH\phi(k) = KRCH\phi \times \sigma\phi(k) \quad (4)$$

$$UADP\phi(k) = KADP\phi \times \sum_{i=0}^{k} \sigma\phi(i) \quad (5)$$

$$KAF(k) = 1 + URCH\phi(k) + UADP\phi(k) \quad (6)$$

In the equation (3), POLE$\phi$ is a response characteristic specifying parameter for specifying the damping characteristic of the deviation E$\phi$, which is set to a value between "−1" and "0". KRCH$\phi$ of the equation (4) and KADP$\phi$ of the equation (5) are respectively a reaching law control gain and an adaptive law control gain, each of which is set to a predetermined value. It is to be noted that it is not necessary to add "1" in the equation (6) when the initial value of the adaptive law control term UADP$\phi$(k) is set to "1".

The multiplying block 39 calculates the fuel injection amount GFUEL(k) by multiplying the air-fuel ratio correction coefficient KAF(k) by the demand fuel amount GFUEL-CMD(k) as the following equation (7).

$$GFUEL(k)=GFUELCMD(k) \times KAF(k) \qquad (7)$$

Next, the calculation processes in the demand intake air amount calculation block 33, the target O2 sensor output calculation block 34, and the O2 feedback controller 35 are specifically described with reference to FIGS. 7-9.

FIG. 7 is a flowchart of the operation process in the demand intake air amount calculation block 33.

In step S11, it is determined whether or not the basic target equivalent ratio KCMDBS(k) less than "1.0". If the answer to step S11 is affirmative (YES), it is further determined whether or not the lean operation permission flag FLEANOK is equal to "0" (step S12). If the answer to step S12 is affirmative (YES), a modified target equivalent ratio KCMDBSMOD(k) is set to "1.0" (step S15). If the answer to step S11 is negative (NO), the process immediately proceeds to step S16.

If the answer to step S12 is negative (NO), i.e., the lean operation is permitted, it is determined whether or not the SCR catalyst temperature TSCR(k) is lower than a lower limit temperature TSCRL (for example, 160 degrees C.) (step S13). If the answer to step S13 is negative (NO), it is determined whether or the SCR catalyst temperature TSCR(k) is higher than a higher limit temperature TSCRH (for example, 500 degrees C.) (step S14). If the answer to step S13 or S14 is affirmative (YES), the NOx removing rate of the SCR catalyst 8 is low. Accordingly, the process proceeds to step S15.

If the answer to step S14 is negative (NO), i.e., the SCR catalyst temperature TSCR is equal to or higher than the lower limit temperature TSCRL, and is equal to or lower than the higher limit temperature TSCRH, which indicates that the NOx removing by the SCR catalyst 8 is possible, the process proceeds to step S16, in which the modified target equivalent ratio KCMDBSMOD(k) is set to the basic target equivalent ratio KCMDBS(k). According to steps S11-S15, when the basic target equivalent ratio KCMDBS(k) is set to a value lower than "1.0" but the lean operation is not permitted, or when the SCR catalyst temperature TSCR is outside the allowable range, the modified target equivalent ratio KCMDBSMOD(k) is set to "1.0", since the lean operation is not actually performed.

In step S17, the demand fuel amount GFUELCMD(k) and the modified target equivalent ratio KCMDBSMOD(k) are applied to the following equation (8), to calculate the demand intake air amount GCYLCMD(k).

$$GCYLCMD(k)=GFUELCMD(k)/KCMDBSMOD(k) \qquad (8)$$

FIG. 8 is a flowchart of the calculation process in the target O2 sensor output calculation block 34.

In step S21, it is determined whether or not the basic target equivalent ratio KCMDBS(k) ie equal to or greater than "1.0". If the answer to step S21 is negative (NO), it is further determined whether or not the lean operation permission flag FLEANOK(n) is equal to "1" (step S22). "n" is a discrete time digitized with a control period ΔTNH3 (e.g., 0.5 seconds) of the NH3 injection amount.

If the answer to step S21 or S22 is affirmative (YES), the target O2 sensor output VO2TRGT is set to a stoichiometric target value VO2ST (e.g., about 0.6 V) (step S23).

Figure 2:
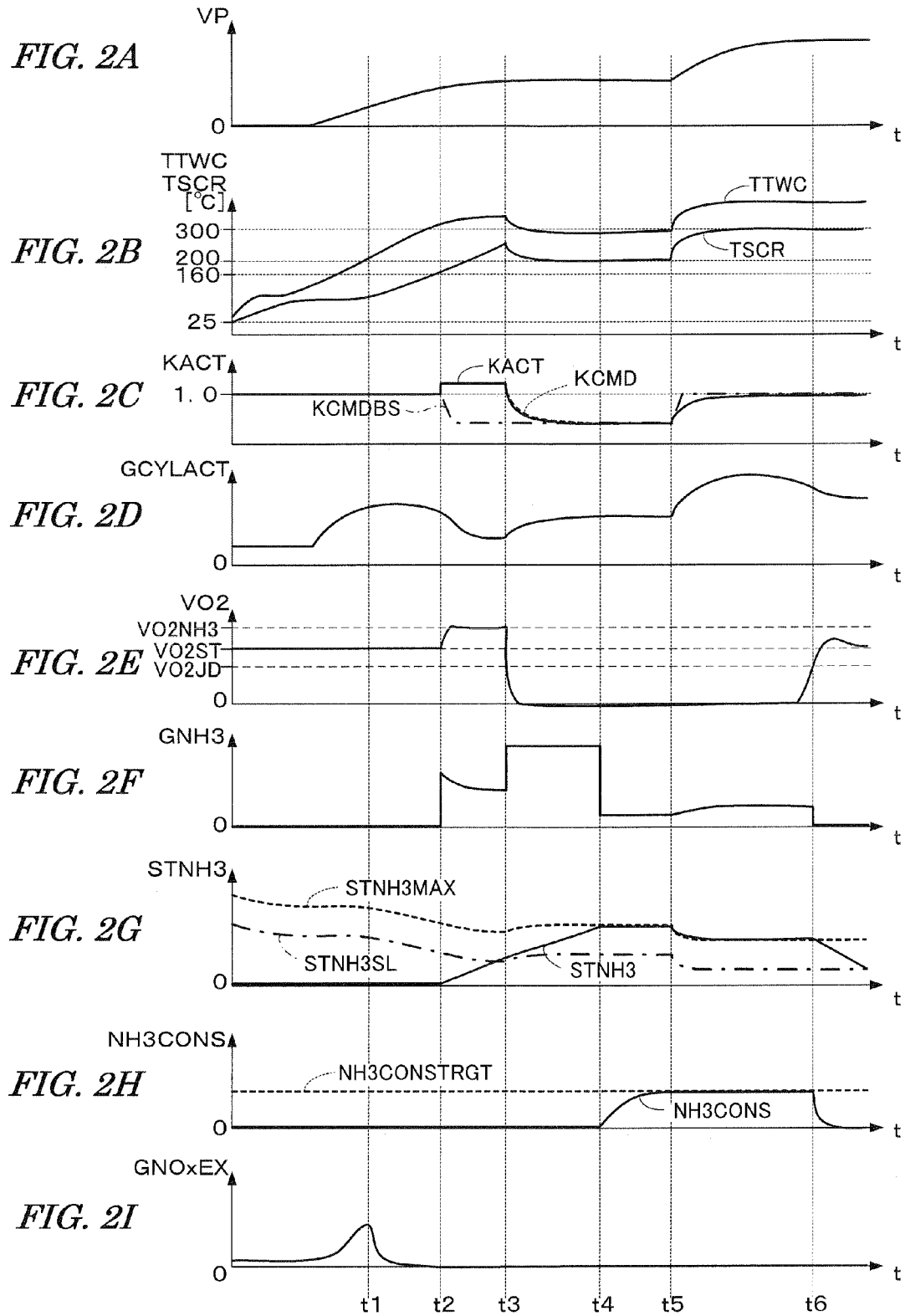
FIGS. 2A-2I show time charts for illustrating an outline of the present invention.

If the answer to step S22 is negative (NO), i.e., the lean operation execution condition is satisfied (KCMDBS(k)<1.0) and the lean operation permission flag FLEANOK(n) "0", the target O2 sensor output VO2TRGT is set to an NH3 generation target value VO2NH3 (e.g., about 0.75 V) (step S24). Accordingly, NH3 is generated in the three-way catalyst 7 during the lean transition period (FIG. 2, t2-t3).

FIG. 9 is a flowchart of the calculation process in the O2 feedback controller 35.

In step S31, the O2 sensor output VO2 and the target O2 sensor output VO2TRGT are applied to the following equation (9) to calculate a deviation EVO2(k), and the deviation EVO2(k) is applied to the following equation (10) to calculate a switching function value σVO2k). In the equation (10), POLEV is a response characteristic specifying parameter for specifying a damping characteristic of the deviation EVO2. The response characteristic specifying parameter POLEV is set to a value between "−1" and "0".

$$EVO2(k)=VO2(k)-VO2TRGT(k) \qquad (9)$$

$$\sigma VO2(k)=EVO2(k)+POLEV \times EVO2(k-1) \qquad (10)$$

In step S32, the switching function value σVO2(k) is applied to the following equations (11) and (12) to calculate a reaching law control term URCHV(k) and an adaptive law control term UADPV(k). KRCHV in the equation (11) and KADPV in the equation (12) are respectively a reaching law control gain and an adaptive law control gain, each of which is set to a predetermined value.

$$URCHV(k) = KRCHV \times \sigma VO2(k) \qquad (11)$$

$$UADPV(k) = KADPV \times \sum_{i=0}^{k} \sigma VO2(i) \qquad (12)$$

In step S33, it is determined whether or not the basic target equivalent ratio KCMDBS(k) is less than "1.0". If the answer to step S33 is affirmative (YES), it is further determined whether or not the lean operation permission flag FLEANOK (n) is equal to "0" (step S34). If the answer to step S33 is negative (NO), or the answer to step S34 is affirmative (YES), the lean operation is not performed. Accordingly, the process proceeds to step S35, in which the target equivalent ratio modification amount DKCMD(k) is set to a sum of the reaching law control term URCHV(k) and the adaptive law control term UADPV(k) (the following equation (13)).

$$DKCMD(k)=URCHV(k)+UADPV(k) \qquad (13)$$

If the answer to step S34 is negative (NO), the lean operation is performed. Accordingly, the target equivalent ratio modification amount DKCMD is set to "0" (step S36).

Figure 10:
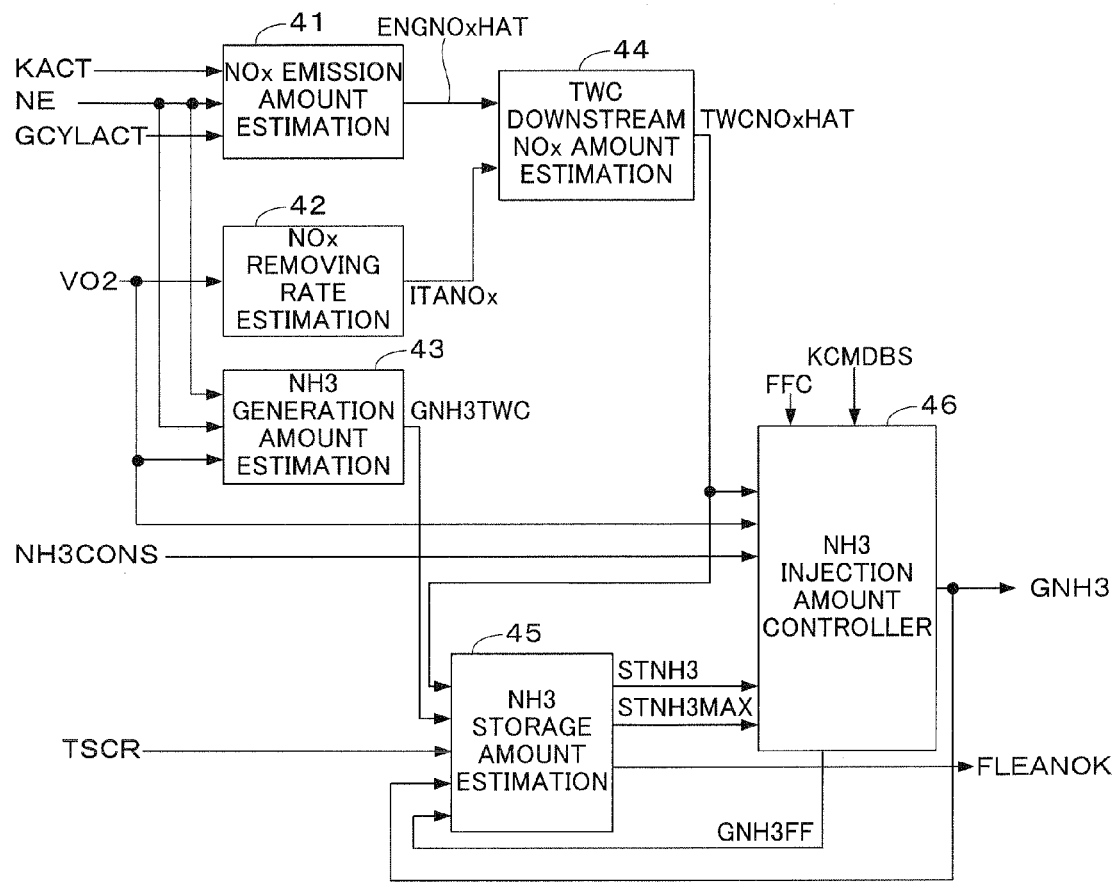
FIG. 10 is a block diagram showing a configuration of an NH3 injection control module.

FIG. 10 is a block diagram showing a configuration of the NH3 injection control module for performing the injection control of NH3 gas by the NH3 injection valve 21. The function of each block shown in FIG. 10 is realized by the calculation processes executed by the CPU in the ECU 10.

The NH3 injection control module includes a NOx emission amount estimation block 41, a NOx removing rate estimation block 42, an NH3 generation amount estimation block 43, a TWC downstream NOx amount estimation block 44, an NH3 storage amount estimation block 45, and an NH3 injection amount controller 46.

The NOx emission amount estimation block 41 calculates an estimated NOx emission amount ENGNOxHAT, which indicates an estimated amount of NOx emitted from the engine 1, according to the detected equivalent ratio KACT, the engine rotational speed NE, and the detected intake air amount GCYLACT.

Figure 15A:
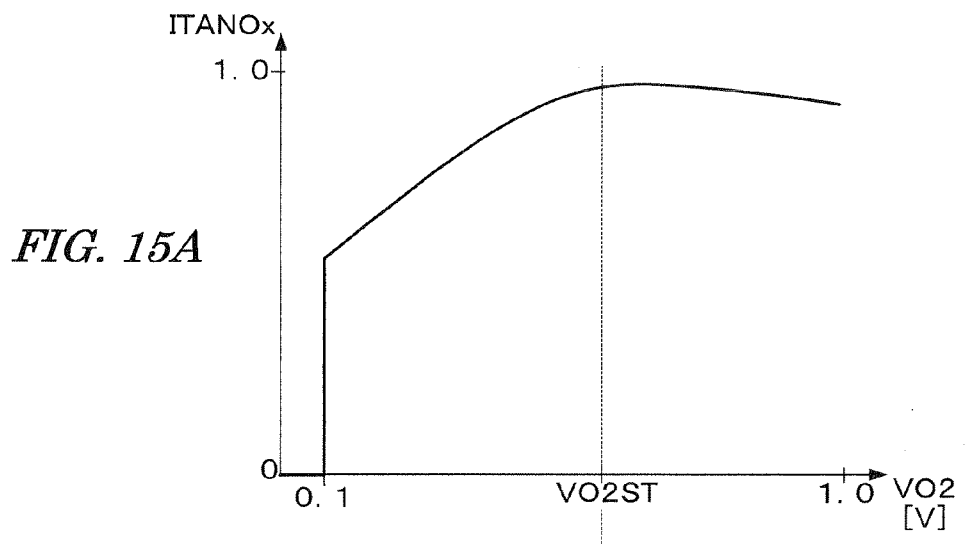
FIGS. 15A-15C show tables referred to in the calculation process in the NOx removing rate estimation block, the NH3 generation amount estimation block, and the NH3 storage amount estimation block which are shown in FIG. 10.

The NOx removing rate estimation block 42 calculates an estimated NOx removing rate ITANOx, which indicates an estimated value of a NOx removing rate of the three-way catalyst 7, according to the O2 sensor output VO2. Specifically, an ITANOx table shown in FIG. 15A is retrieved according to the O2 sensor output VO2 to calculate the estimated NOx removing rate ITANOx(n). The ITANOx table is set so that the estimated NOx removing rate ITANOx takes the maximum value when the O2 sensor output VO2 is equal to the stoichiometric target value VO2ST, and takes a value of "0" when the O2 sensor output VO2 is equal to or less than "0.1V".

The TWC downstream NOx amount estimation block 44 calculates an estimated TWC downstream NOx amount TWCNOxHAT according to the estimated NOx emission amount ENGNOxHAT and the estimated NOx removing rate ITANOx. The estimated TWC downstream NOx amount TWCNOxHAT indicates an estimated amount of NOx emitted to the downstream side of the three-way catalyst 7.

The NH3 generation amount estimation block 43 calculates an estimated NH3 generation amount GNH3TWC, which indicates an estimated amount of NH3 generated in the three-way catalyst 7, according to the engine rotational speed NE, the detected intake air amount GCYLACT, and the O2 sensor output VO2.

The NH3 storage amount estimation block 45 calculates the estimated NH3 storage capacity STNH3MAX according to the SCR catalyst temperature TSCR, and calculates the estimated NH3 storage amount STNH3 according to the estimated TWC downstream NOx amount TWCNOxHAT, the estimated NOx generation amount GNH3TWC, the SCR catalyst temperature TSCR, the NH3 injection amount GNH3 (the preceding value), and the feedforward NH3 injection amount GNH3FF (the preceding value). Further, the NH3 storage amount estimation block 45 sets the lean operation permission flag FLEANOK according to the estimated NH3 storage amount STNH3. The NH3 injection amount GNH3 and the feedforward NH3 injection amount GNH3FF are calculated in the NH3 injection amount controller 46.

The NH3 injection amount controller 46 calculates a feedforward NH3 injection amount GNH3FF according to the estimated TWC downstream NOx amount TWCNOxHAT, and calculates the NH3 injection amount GNH3 according to the feedforward NH3 injection amount GNH3FF, the O2 sensor output VO2, the NH3 concentration NH3CONS detected by the NH3 concentration sensor 17, the estimated NH3 storage amount STNH3, the estimated NH3 storage capacity STNH3MAX, the basic target equivalent ratio KCMDBS, and a fuel cut flag FFC. The fuel cut flag FFC is set to "1" when performing the fuel cut operation in which the fuel supply to the engine 1 is stopped.

Figure 11:
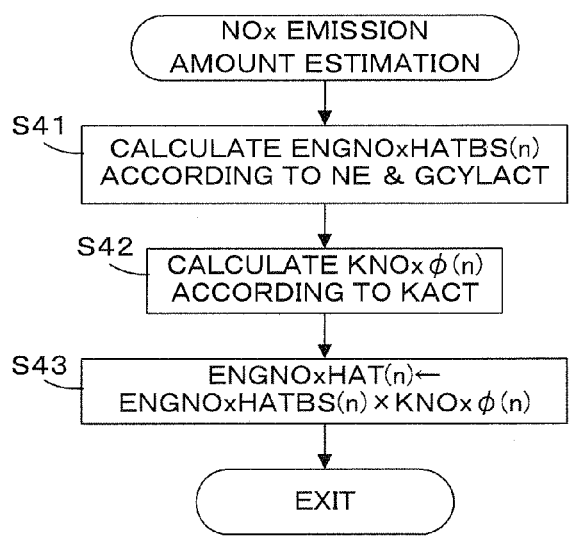
FIG. 11 is a flowchart of a calculation process in the NOx emission amount estimation block shown in FIG. 10.

FIG. 11 is a flowchart of the calculation process in the NOx emission amount estimation block 41.

In step S41, an ENGNOxHATBS map shown in FIG. 12A is retrieved according to the engine rotational speed NE and the detected intake air amount GCYLACT, to calculate a basic estimated NOx emission amount ENGNOxHATBS(n). The ENGNOxHATBS map is set so that the basic estimated NOx emission amount ENGNOxHATBS increases as the detected intake air amount GCYLACT increases, and the basic estimated NOx emission amount ENGNOxHATBS increases as the engine rotational speed NE increases. The three curves shown in FIG. 12A respectively correspond to predetermined engine rotational speeds NE1, NE2, and NE3, and the three predetermined engine rotational speeds satisfy the relationship of "NE1<NE2<NE3".

In step S42, a KNOxφ table shown in FIG. 12B is retrieved according to the detected equivalent ratio KACT to calculate an equivalent ratio correction coefficient KNOx φ(n). The KNOxφ table is set so that the equivalent ratio correction coefficient KNOxφ takes the maximum value when the detected equivalent ratio KACT takes a value in the vicinity of "0.9". That is, the equivalent ratio correction coefficient KNOxφ increases as the detected equivalent ratio KACT increases in the range where the detected equivalent ratio KACT is less than "0.9", and the equivalent ratio correction coefficient KNOxφ decreases as the detected equivalent ratio KACT increases in the range where the detected equivalent ratio KACT is greater than "0.9". It is to be noted that the equivalent ratio of "0.9" corresponds to an air-fuel ratio of "16.0".

In step S43, the basic estimated NOx emission amount ENGNOxHATBS(n) and the equivalent ratio correction coefficient KNOxφ(n) are applied to the following equation (20) to calculate the estimated NOx emission amount ENGNOxHAT(n).

$$ENGNOxHAT(n)=ENGNOxHATBS(n) \times KNOx\phi(n) \qquad (20)$$

FIG. 13 is a flowchart of the calculation process in the NH3 generation amount estimation block 43.

Figure 15B:
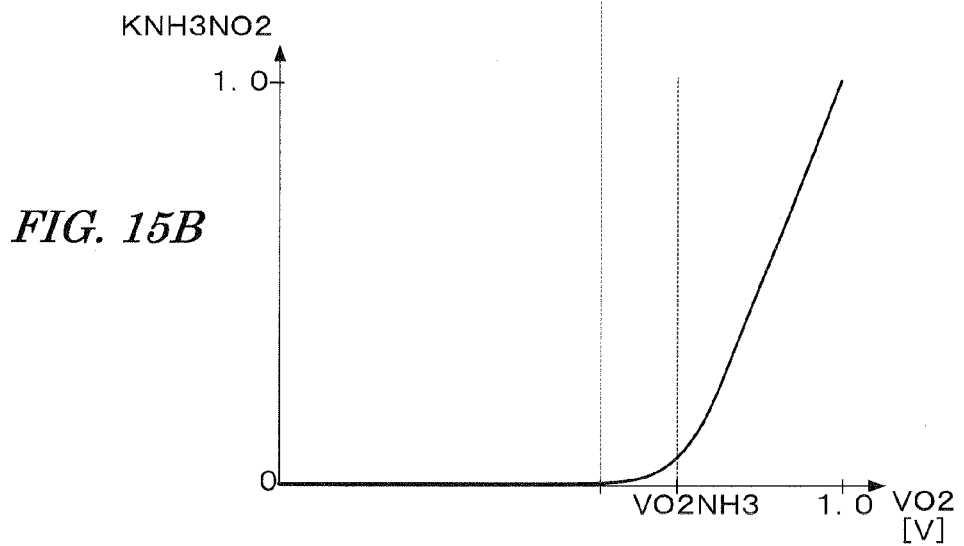

In step S51, a KNH3VO2 table shown in FIG. 15B is retrieved according to the O2 sensor output VO2 to calculate an NH3 generation coefficient KNH3VO2(n). The KNH3VO2 table is set so that the NH3 generation coefficient KNH3VO2 increases as the O2 sensor output VO2 increases (as the oxygen concentration decreases) in the range where the O2 sensor output VO2 is higher than the stoichiometric target value VO2ST. The NH3 generation target value VO2NH3 corresponds to a value of the O2 sensor output at which the NH3 generation coefficient KNH3VO2 takes a value slightly greater than "0".

In step S52, the detected intake air amount GCYLACT(n) and the engine rotational speed NE(n)[rpm] are applied to the following equation (21) to calculate an estimated exhaust gas amount GEXHAT(n) which is an estimated value of the exhaust gas amount (mass) per the NH3 injection control period ΔTNH3 [sec]. It is to be noted that the equation (21) corresponds to a 4-cylinder engine.

$$GEXHAT(n)=GCYLACT(n) \times NE(n) \times \Delta TNH3 \times 2/60 \qquad (21)$$

In step S53, the NH3 generation coefficient KNH3VO2(n) and the estimated exhaust gas amount GEXHAT(n) are applied to the following equation (22) to calculate the estimated NH3 generation amount GNH3TWC(n).

$$GNH3TWC(n)=KNH3VO2(n) \times GEXHAT(n) \qquad (22)$$

Figure 14:
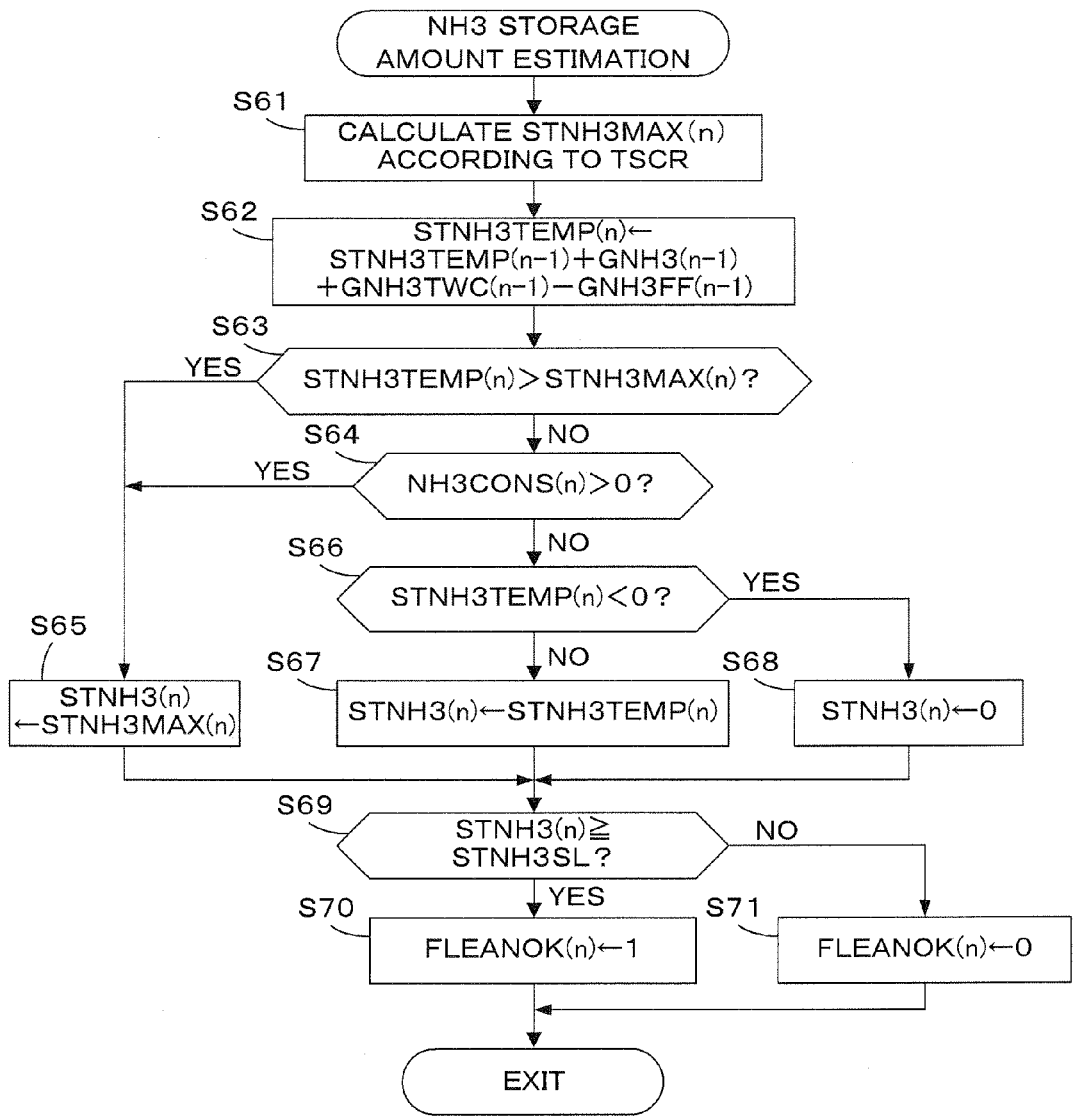
FIG. 14 is a flowchart of a calculation process in the NH3 storage amount estimation block shown in FIG. 10.

FIG. 14 is a flowchart of the calculation process in the NH3 storage amount estimation block 45.

Figure 15C:
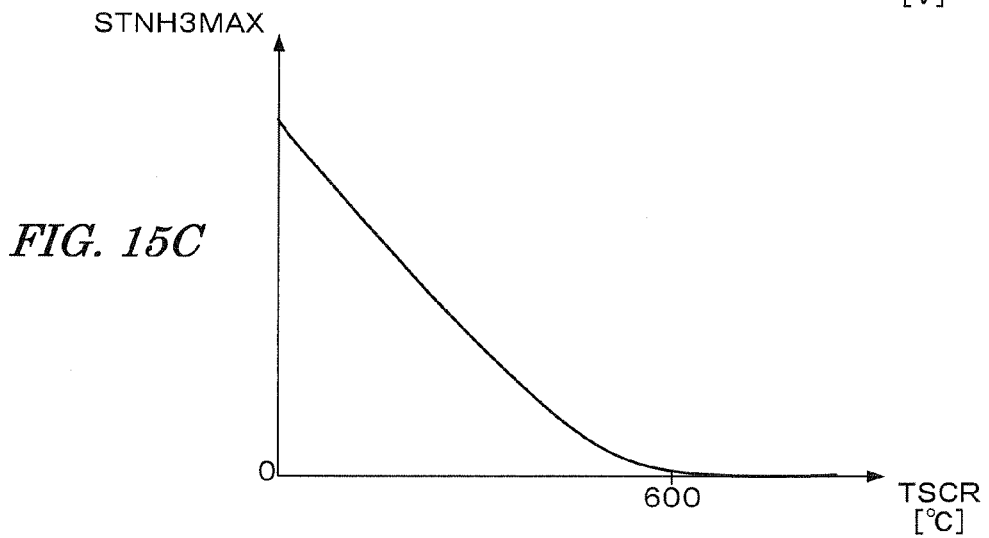

In step S61, an STNH3MAX table shown in FIG. 15C is retrieved according to the SCR catalyst temperature TSCR to calculate the NH3 storage capacity STNH3MAX(n). In step S62, the preceding value GNH3(n−1) of the NH3 injection amount, the preceding value GNH3TWC(n−1) of the estimated NH3 generation amount, and the preceding value GNH3FF(n−1) of the feedforward NH3 injection amount are applied to the following equation (23) to calculate a storage amount calculation parameter STNH3TEMP(n) for calculating the estimated NH3 storage amount STNH3. The feedforward NH3 injection amount GNH3FF is included in the equation (23) as a subtracting term, since the feedforward NH3 injection amount GNH3FF corresponds to a consumption amount of NH3 in the SCR catalyst 8 (per control period).

$$STNH3TEMP(n)=STNH3TEMP(n-1)+GNH3(n-1)+ \\ GNH3TWC(n-1)-GNH3FF(n-1) \qquad (23)$$

In step S63, it is determined whether or not the storage amount calculation parameter STNH3TEMP(n) is greater than the estimated NH3 storage capacity STNH3MAX(n). If the answer to step S63 is negative (NO), it is further determined whether or not the NH3 concentration NH3CONS(n) detected by the NH3 concentration sensor 17 is greater than "0" (step S64). If the answer to step S63 or step S64 is affirmative (YES), the estimated NH3 storage amount STNH3(n) is set to the estimated NH3 storage capacity STNH3MAX(n) (step S65).

If the answer to step S64 is negative (NO), it is further determined whether or not the storage amount calculation parameter STNH3TEMP(n) is less than "0" (step S66). If the answer to step S66 is negative (NO), the estimated NH3 storage amount STNH3(n) is set to the storage amount calculation parameter STNH3TEMP(n) (step S67). If the storage amount calculation parameter STNH3TEMP(n) takes a negative value, the estimated NH3 storage amount STNH3(n) is set to "0" (step S68).

In step S69, it is determine whether or not the calculated estimated NH3 storage amount STNH3(n) is equal to or greater than the lean switching determination threshold value STNH3SL. If the answer to step S69 is affirmative (YES), the lean operation permission flag FLEANOK(n) is set to "1" (step S70). If the answer to step S69 is negative (NO), the lean operation permission flag FLEANOK(n) is set to "0" (step S71).

Figure 16:
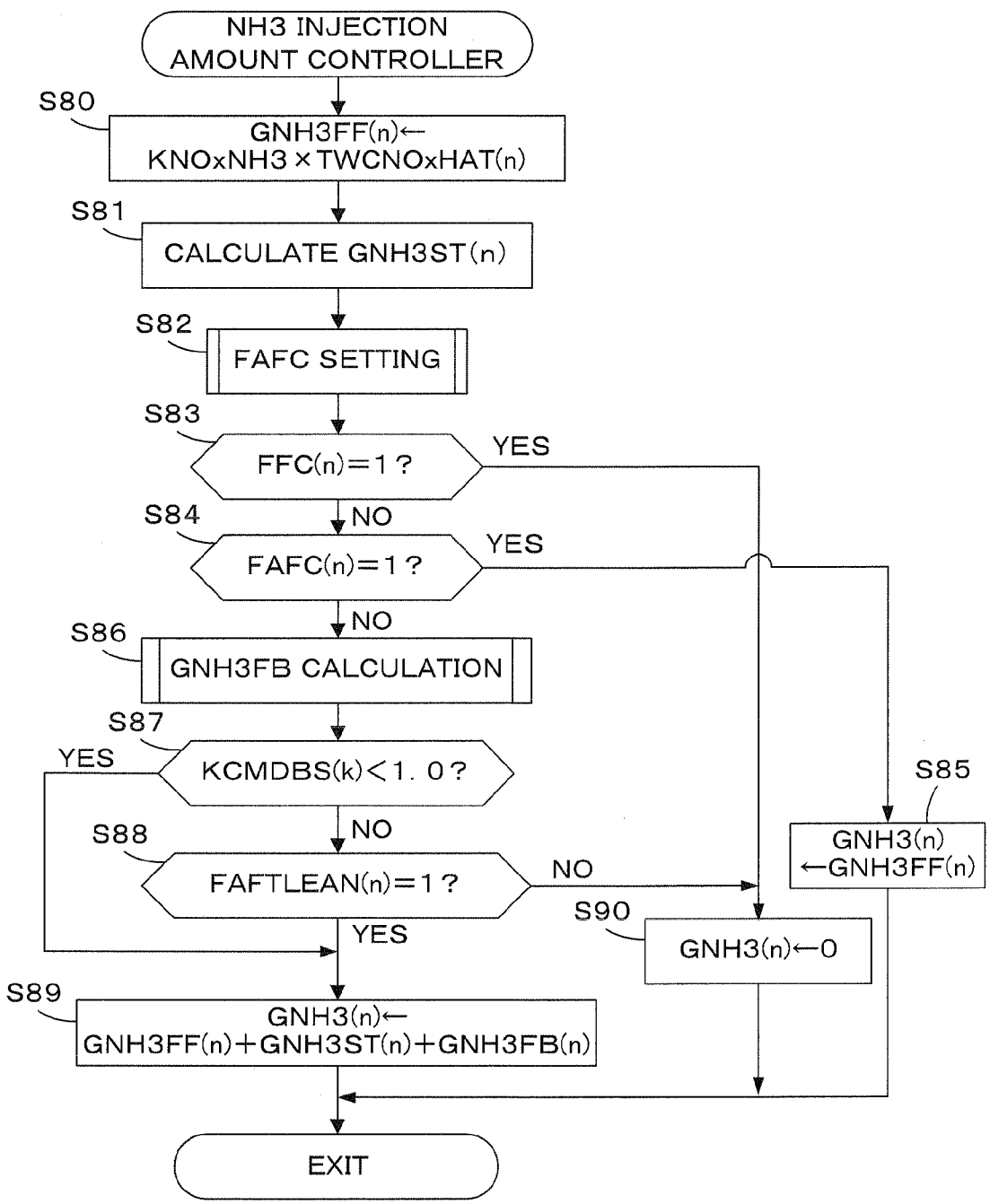
FIG. 16 is a flowchart of a calculation process in the NH3 injection amount controller shown in FIG. 10.

FIG. 16 is a flowchart of the calculation process in the NH3 injection amount controller 46.

In step S80, the estimated TWC downstream NOx amount TWCNOxHAT(n) is applied to the following equation (24) to calculate the feedforward NH3 injection amount GNH3FF(n).

$$GNH3FF(n)=KNOxNH3 \times TWCNOxHAT(n) \quad (24)$$

In the equation (24), KNOxNH3 is a predetermined conversion coefficient for converting the NOx amount to the NH3 amount required for reducing the NOx. The predetermined conversion coefficient KNOxNH3 is set, for example, to "0.53". Therefore, the feedforward NH3 injection amount GNH3FF(n) is calculated as the NH3 amount required for reducing all of the NOx discharged to the downstream side of the three-way catalyst 7.

In step S81, a maximum amount maintaining NH3 injection amount GNH3ST(n) is calculated so that the estimated NH3 storage amount STNH3(n) is maintained at the estimated NH3 storage capacity STNH3MAX(n). Specifically, in order to prevent the NH3 storage amount in the SCR catalyst 8 from rapidly increasing (to prevent the NH3 slip from rapidly occurring on the downstream side of the SCR catalyst 8), the maximum amount maintaining NH3 injection amount GNH3ST(n) is calculated using the IP control (the proportional-integral control in which the integral control has priority to the proportional control) algorithm so that the estimated NH3 storage amount STNH3(n) coincides with the estimated NH3 storage capacity STNH3MAX(n).

In the IP control, a proportional control term UPST(n) and an integral control term UIST(n) are calculated by the following equations (25) and (26), and the maximum quantity maintaining NH3 injection amount GNH3ST(n) is calculated as a sum of the proportional control term UPST(n) and the integral control term UIST(n) (the following equation (27)).

$$UPST(n) = KPST \times STNH3(n) \quad (25)$$

$$UIST(n) = KIST \times \sum_{i=0}^{n} (STNH3(i) - STNH3MAX(i)) \quad (26)$$

$$GNH3ST(n) = UPST(n) + UIST(n) \quad (27)$$

KPST in the equation (25) and KIST in the equation (26) are respectively a predetermined proportional control term gain and a predetermined integral control term gain.

Figure 18:
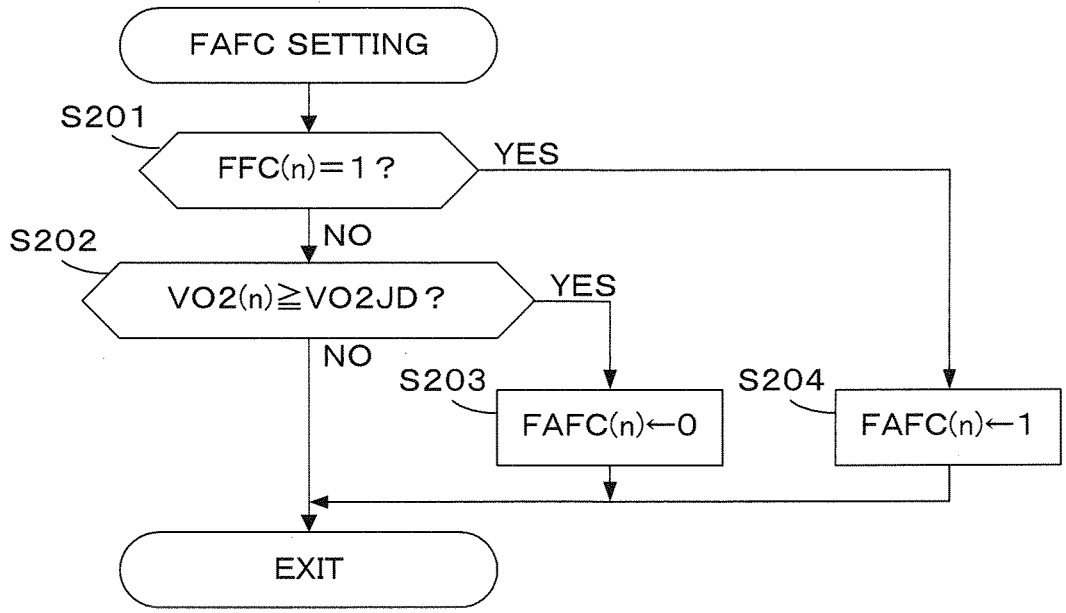
FIG. 18 is a flowchart of the FAFC setting process executed in the process of FIG. 16.

In step S82, the FAFC setting process shown in FIG. 18 is executed to set an after-fuel cut NH3 injection flag FAFC. In step S201 of FIG. 18, it is determined whether or not the fuel cut flag FFC(n) is "1". If the answer to step S201 is affirmative (YES), the after-fuel cut NH3 injection flag FAFC(n) is set to "1" (step S204).

If the answer to step S201 is negative (NO), it is further determined whether or not the O2 sensor output VO2 is equal to or higher than the NH3 injection stop threshold value VO2JD (step S202). If the answer to step S202 is affirmative (YES), the after-fuel cut NH3 injection flag FAFC(n) is set to "0" (step S203). If the answer to step S202 is negative (NO), the process ends.

According to the process of FIG. 18, the after-fuel cut NH3 injection flag FAFC is set to "1" during the fuel cut operation and the period from the end of the fuel cut operation to the time the O2 sensor output VO2 becomes equal to or higher than the NH3 injection stop threshold value VO2JD.

Returning to FIG. 16, in step S83, it is determined whether or not the fuel cut flag FFC(n) is "1". If the answer to step S83 is affirmative (YES), the NH3 injection amount GNH3(n) is set to "0" (step S90) to stop the injection of NH3. If the answer to step S83 is negative (NO), it is further determined whether or not the after-fuel cut NH3 injection flag FAFC(n) is "1" (step S84). If the answer to step S84 is affirmative (YES), the NH3 injection amount GNH3(n) is set to the feedforward NH3 injection amount GNH3FF(n). In the rich transition period immediately after the end of the fuel cut operation, an amount of NH3 required for reducing NOx discharged to the downstream side of the three-way catalyst 7 is supplied to the SCR catalyst 8, which makes it possible to prevent the NOx emission amount from increasing immediately after the end of the fuel cut operation. In addition, by stopping the NH3 injection during the fuel cut operation, the consumption amount of NH3 can be reduced.

Figure 17:
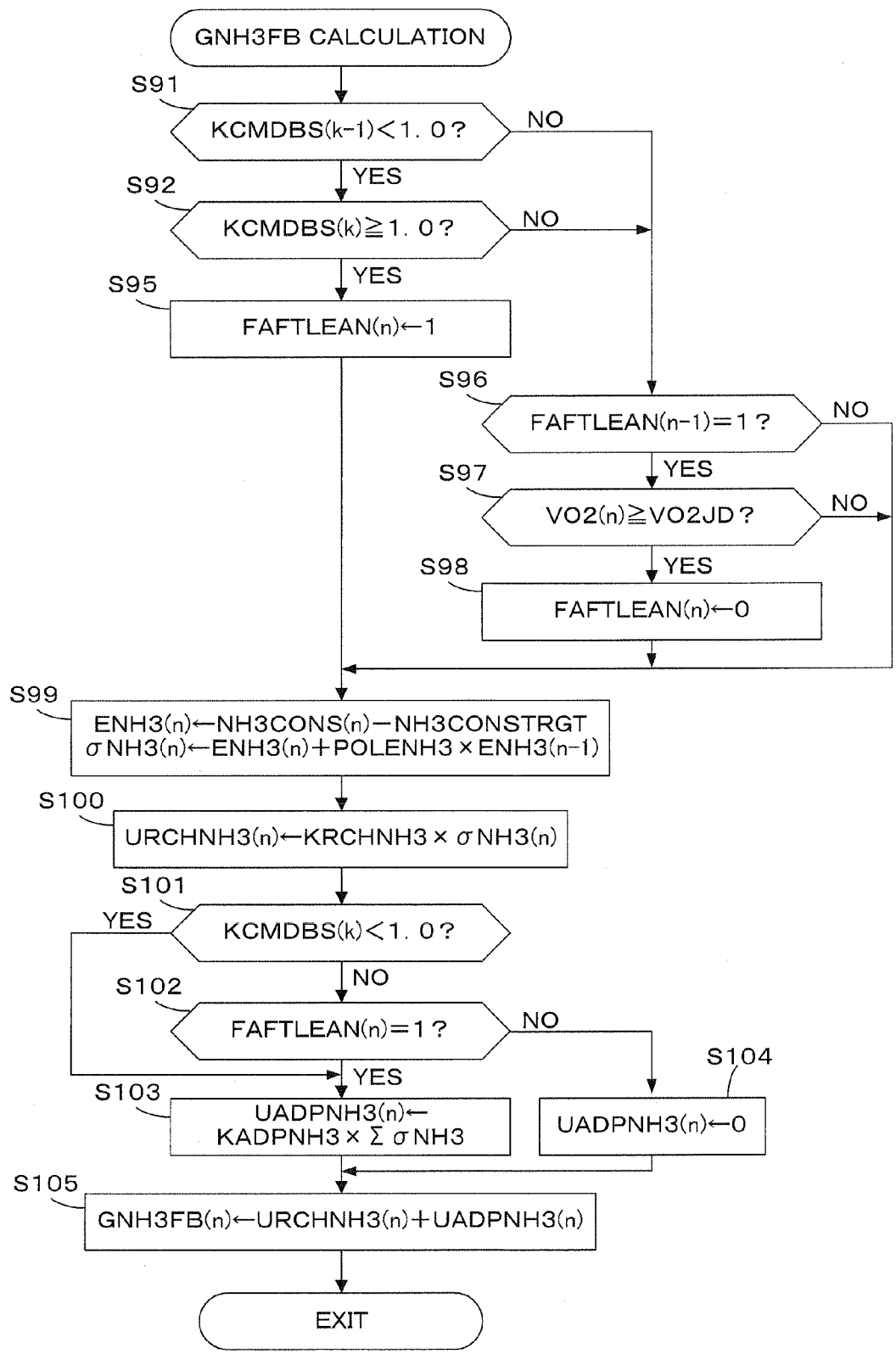
FIG. 17 is a flowchart of the feedback NH3 injection amount calculation process executed in the process of FIG. 16.

If the answer to step S84 is negative (NO), the GNH3FB calculation process shown in FIG. 17 is executed to calculate the feedback NH3 injection amount GNH3FB so that the detected NH3 concentration NH3CONS coincides with the target NH3 concentration NH3CONSTRGT (e.g., a value corresponding to 5 ppm) (step S86).

In step S87, it is determined whether or not the basic target equivalent ratio KCMDBS(k) is less than "1.0". If the answer to step S87 is negative (NO), it is further determined whether or not an after-lean operation NH3 injection flag FAFTLEAN(n) is "1" (step S88). The after-lean operation NH3 injection flag FAFTLEAN(n) is set in the process of FIG. 17 (steps S91, S92, S95-S98). Specifically, the after-lean operation NH3 injection flag FAFTLEAN(n) is set to "1" during the rich transition period after the lean operation, i.e., when performing the NH3 injection immediately after the end of the lean operation.

If the answer to step S87 or S88 is affirmative (YES), the NH3 injection is performed. Accordingly, the feedforward NH3 injection amount GNH3FF(n), the maximum amount maintaining NH3 injection amount GNH3ST(n), and the feedback NH3 injection amount GNH3FB(n) is applied to the following equation (28) to calculate the NH3 injection amount GNH3(n) (step S89).

$$GNH3(n)=GNH3FF(n)+GNH3ST(n)+GNH3FB(n) \quad (28)$$

On the other hand, if the answer to step S88 is negative (NO), the process proceeds to step S90, in which the NH3 injection amount GNH3(n) is set to "0".

FIG. 17 is a flowchart of the GNH3FB calculation process executed in step S86 of FIG. 16.

In step S91, it is determined whether or not the preceding value KCMDBS(k−1) of the basic target equivalent ratio is less than "1.0". If the answer to step S91 is affirmative (YES), it is further determined whether the present value KCMDBS (k) is equal to or greater than "1.0" (step S92). If both of the answers to steps S91 and S92 are affirmative (YES), i.e., immediately after the end of the lean operation, the after-lean operation NH3 injection flag FAFTLEAN(n) is set to "1" (step S95). Thereafter the process proceeds to step S99.

If the answer to step S91 or S92 is negative (NO), it is determined whether or not the preceding value FAFTLEAN (n−1) of the after-lean operation NH3 injection flag is "1" (step S96). If the answer to step S96 is affirmative (YES), it is further determined whether or not the O2 sensor output VO2 is higher than the NH3 injection stop threshold value VO2JD (step S97). If the answer to step S97 is affirmative (YES), i.e., the O2 sensor output VO2 reaches the NH3 injection stop threshold value VO2JD when continuing the NH3 injection, the after-lean operation NH3 injection flag FAFTLEAN(n) is returned to "0" (step S98). Accordingly, the rich transition period immediately after the end of the lean operation is terminated, and the NH3 injection is stopped.

If the answer to step S96 or S97 is negative (NO), the process proceeds to step S99.

In step S99, the detected NH3 concentration NH3CONS and the predetermined target NH3 concentration NH3CONSTRGT are applied to the following equation (29) to calculate a deviation ENH3(n), and the deviation ENH3(n) is applied to the following equation (30) to calculate a switching function value σNH3(n). In the equation (30), POLENH3 is a response characteristic specifying parameter for specifying the damping characteristic of the deviation ENID. The response characteristic specifying parameter POLENH3 is set to a value between "−1" and "0".

$$ENH3(n) = NH3CONS(n) - NH3CONSTRGT \tag{29}$$

$$\sigma NH3(n) = ENH3(n) + POLENH3 \times ENH3(n-1) \tag{30}$$

In step S100, the switching function value σNH3(n) is applied to the following equation (31) to calculate a reaching law control term URCHNH3(n). In the equation (31), KRCHNH3 is a reaching law control gain which is set to a predetermined value.

$$URCHNH3(n) = KRCHNH3 \times \sigma NH3(n) \tag{31}$$

In next step S101, it is determined whether or not the basic target equivalent ratio KCMDBS(k) is less than "1.0". If the answer to step S101 is negative (NO), it is further determined whether or not the after-lean operation NH3 injection flag FAFTLEAN(n) is "1" (step S102).

If the answer to step S101 or S102 is affirmative (YES), the NH3 injection is performed. Accordingly, the switching function value σNH3(n) is applied to the following equation (32) to calculate an adaptive law control term UADPNH3(n) (step S103).

$$UADPNH3(n) = KADPNH3 \times \sum_{i=0}^{n} \sigma NH3(i) \tag{32}$$

On the other hand, if the answer to step S102 is negative (NO), the adaptive law control term UADPNH3(n) is set to "0" (step S104).

In step S105, the reaching law control term URCHNH3(n) and the adaptive law control term UADPNH3(n) are applied to the following equation (33) to calculate the feedback NH3 injection amount GNH3FB(n).

$$GNH3FB(n) = URCHNH3(n) + UADPNH3(n) \tag{33}$$

Figure 19:
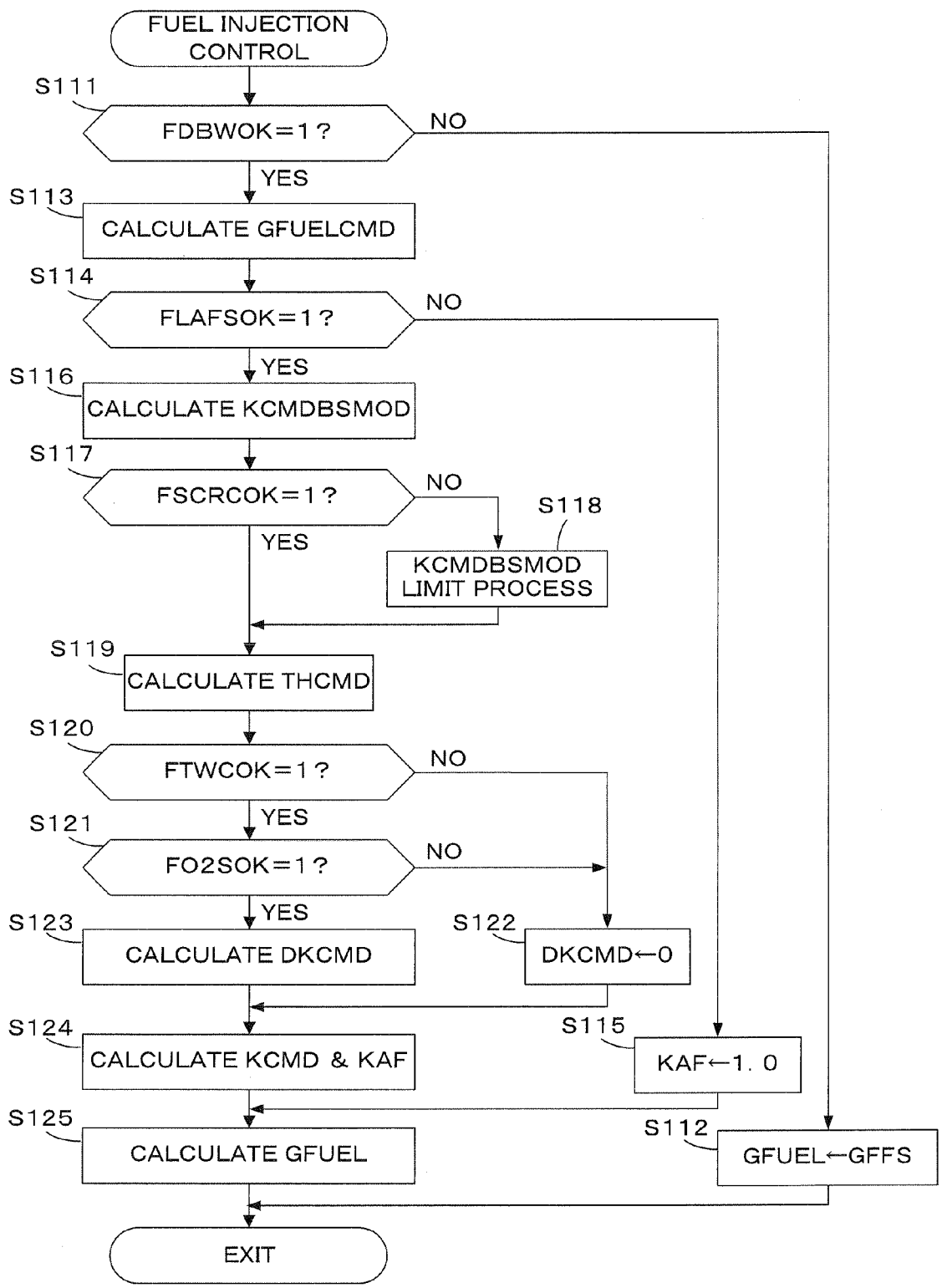
FIG. 19 is a flowchart showing a general configuration of a fuel injection control process.

FIG. 19 is a flowchart showing a general configuration of the fuel injection control process which is executed in synchronism with generation of the TDC pulse by the CPU in the ECU 10.

In step S111, it is determined whether or not an intake air control device normal flag FDBWOK is "1". The intake air control device normal flag FDBWOK is set to "1" when the intake air control device including the throttle valve 3 and the actuator 4 is normal. If the answer to step S111 is negative (NO), i.e., a failure is detected in the intake air control device, the fuel injection amount GFUEL is set to a predetermined fail-safe value GFFS (step S112).

If the answer to step S111 is affirmative (YES), the demand fuel amount GFUELCMD is calculated according to the engine rotational speed NE and the demand torque TRQRQ (step S113). Next, it is determined whether or not a LAF sensor normal flag FLAFSOK is "1" (step S114). The LAF sensor normal flag FLAFSOK is set to "1" when the normal LAF sensor 14 is normal. If the answer to step S114 is negative (NO), the air-fuel ratio correction coefficient KAF is set to "1.0" (step S115), and the process proceeds to step S125.

If the answer to step S114 is affirmative (YES), the modified target equivalent ratio KCMDBSMOD is calculated by the process of FIG. 7 (step S116). Next, it is determined whether or not an SCR catalyst normal flag FSCRCOK is "1" (step S117). The SCR catalyst normal flag FSCRCOK is set to "1" when the SCR catalyst 8 is normal, and is set to "0" when the SCR catalyst 8 is determined to be abnormally deteriorated.

If the answer to step S117 is negative (NO), i.e., the SCR catalyst 8 is determined to be abnormally deteriorated, the limit process is performed so that the modified target equivalent ratio KCMDBSMOD is limited to a value which is equal to or greater than "1.0" (step S118). Thereafter the process proceeds to step S119. If the answer to step S117 is affirmative (YES), the process immediately proceeds to step S119.

In step S119, the demand intake air amount GCYLCMD is calculated by the equation (8), and the target opening THCMD of the throttle valve 3 is calculated so that the detected intake air amount GCYLACT coincides with the demand intake air amount GCYLCMD. In step S120, it is determined whether or not a three-way catalyst normal flag FTWCOK is "1". The three-way catalyst normal flag FTWCOK is set to "1" when the three-way catalyst 7 is normal, and is set to "0" when the three-way catalyst 7 is determined to be abnormally deteriorated.

If the answer to step S120 is affirmative (YES), it is determined whether or not an O2 sensor normal flag FO2SOK is "1" (step S121). The O2 sensor normal flag FSCRCOK is set to "1" when the O2 sensor 15 is normal, and is set to "0" when a failure in O2 sensor 15 is detected. If the answer to step S120 or S121 is negative (NO), the target equivalent ratio modification amount DKCMD is set to "0" (step S122). If the answer to step S121 is affirmative (YES), the target equivalent ratio modification amount DKCMD is calculated by the process of FIG. 9 so that the O2 sensor output VO2 coincides with the target O2 sensor output VO2TRGT (step S123).

In step S124, the target equivalent ratio KCMD is calculated by the above-described equation (1), and the air-fuel ratio correction coefficient KAF is calculated by the equations (2)-(6). In step S125, the fuel injection amount GFUEL is calculated by the above-described equation (7).

Figure 20:
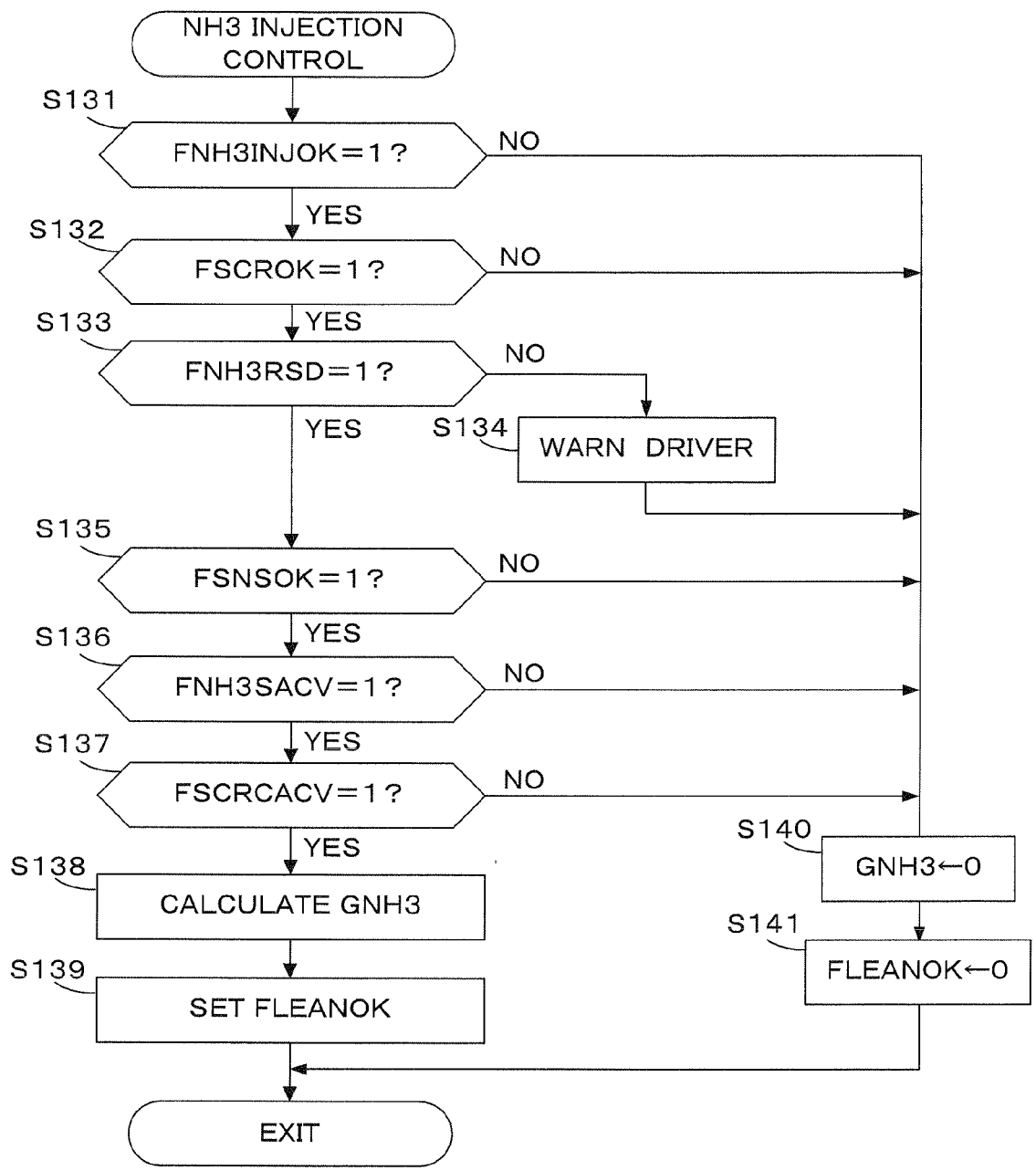
FIG. 20 is a flowchart showing a general configuration of an NH3 injection control process.

FIG. 20 is a flowchart showing a general configuration of the NH3 injection control process, and this process is executed at predetermined intervals (ΔTNH3) by the CPU in the ECU 10.

In step S131, it is determined whether or not an NH3 injection device normal flag FNH3INJOK is "1". The NH3 injection device normal flag FNH3INJOK is set to "1" when the NH3 injection device including the NH3 injection valve 21, the NH3 storage device 22, and the like, is normal. The NH3 injection device normal flag FNH3INJOK is set to "0" when a failure (e.g., a failure of the NH3 injection valve 21, the NH3 generation heater (not shown), etc.) in the NH3 injection device is detected. If the answer to step S131 is affirmative (YES), it is further determined whether or not the SCR catalyst normal flag FSCRCOK is "1" (step S132). If the answer to step S131 or S132 is negative (NO), the NH3 injection amount GNH3 is set to "0", and the lean operation permission flag FLEANOK is set to "0" (steps S140, S141).

If the answer to step S132 is affirmative (YES), it is determined whether or not an NH3 residual flag FNH3RSD is "1" (step S133). The NH3 residual flag FNH3RSD is set to "1" when NH3 remains in the NH3 storage device 22. If the answer to step S133 is negative (NO), the driver is warned by sound and/or display (step S134). Thereafter, the process proceeds to step S140.

If the answer to step S133 is affirmative (YES), it is determined whether or not a sensor OK flag FSNSOK is "1" (step S135). The sensor OK flag FSNSOK is set to "1" when all of the sensors (LAF sensor 14, O2 sensor 15, SCR temperature sensor 16, NH3 concentration sensor 17) are normal, and is set to "0" when a failure of any one of the sensors is detected. If the answer to step S135 is affirmative (YES), it is further determined whether or not an NH3 concentration sensor activation flag FNH3SACV is "1" (step S136). The NH3 concentration sensor activation flag FNH3SACV is set to "1" when the NH3 concentration sensor 17 is activated. If the answer to step S136 is affirmative (YES), it is further determined whether or not an SCR catalyst activation flag FSCRCACV is "1" (step S137). The SCR catalyst activation flag FSCRCACV is set to "1" when the SCR catalyst 8 is activated.

If the answer to any one of steps S135-S137 is negative (NO), the process proceeds to step S140. If all of the answers to steps S135-S137 are affirmative (YES), the NH3 injection amount GNH3 is calculated by the process of FIG. 16 (step S138). Subsequently, the lean operation permission flag FLEANOK is set by the process of FIG. 14 (step S139).

As described above, in this embodiment, when shifting from the stoichiometric operation to the lean operation, the target equivalent ratio KCMD is set to a value greater than "1.0" (the air-fuel ratio is controlled to the rich air-fuel ratio which is richer than the stoichiometric ratio) during the lean transition period (FIG. 2, t2-t3) starting from the time the lean operation execution condition is satisfied, and the target equivalent KCMD ratio is changed to a value corresponding to the lean air-fuel ratio after the lean transition period has elapsed. The desired NOx removing rate cannot be obtained by the SCR catalyst 8 immediately after starting the supply of NH3, but the desired NOx removing rate is obtained after a little delay from the time of starting the NH3 supply. Therefore, by controlling the air-fuel ratio to the rich air-fuel ratio within the lean transition period, NH3 can be generated in the three-way catalyst 7 to improve the NOx removing rate of the SCR catalyst 8. Consequently, the increase in the NOx emission amount can be suppressed immediately after switching the air-fuel ratio to the lean air-fuel ratio.

Further, when performing the stoichiometric operation, the target equivalent ratio KCMD is modified with the target equivalent ratio modification amount DKCMD so that the O2 sensor output VO2 coincides with the stoichiometric target value VO2ST, and the air-fuel ratio control is performed during the lean transition period so that the O2 sensor output VO2 coincides with the NH3 generation target value VO2NH3 which corresponds to the air-fuel ratio richer than the air-fuel ratio corresponding to the stoichiometric target value VO2ST. Accordingly, NH3 is generated in the three-way catalyst 7 during the lean transition period, and the generated NH3 is supplied to the SCR catalyst 8. Therefore, the NH3 injection amount can be reduced, thereby greatly reducing frequency of charging NH3 to the NH3 storage device 22. Further, the air-fuel ratio control is performed according to the O2 sensor output VO2, which prevents the air-fuel ratio from becoming excessively rich and suppresses degradation of the exhaust gas purifying performance of the three-way catalyst 7 during the lean transition period. Consequently, good exhaust characteristic can be maintained.

Further, the NH3 injection is performed by the NH3 injection valve 21 during the lean transition period, which makes it possible to enhance the NOx removing rate of the SCR catalyst 8 to the desired level at the beginning of the lean operation, thereby suppressing the increase in the NOx emission amount immediately after switching the air-fuel ratio to the lean air-fuel ratio.

Further, the lean transition period ends at the time the estimated NH3 storage amount STNH3 indicative of an estimated amount of NH3 stored in the SCR catalyst 8 reaches the lean switching determination threshold value STNH3SL. Accordingly, the NOx emission amount can surely be suppressed immediately after switching the air-fuel ratio to the lean air-fuel ratio.

Further, the lean switching determination threshold value STNH3SL is set to a value which is equal to or greater than 15% of the estimated NH3 storage capacity SRNH3MAX indicative of the maximum storable NH3 amount in the SCR catalyst. The desired NOx removing rate of the SCR catalyst 8 is obtained in the condition where the NH3 storage amount becomes equal to or greater than the value of 15% of the storage capacity (the maximum storage amount). Therefore, by setting the lean switching determination threshold value STNH3SL to a value which is equal to or greater than 15% of the estimated NH3 storage capacity SRNH3MAX, the desired NOx removing rate can surely be obtained at the beginning of the lean operation. In addition, the actual NH3 storage capacity changes depending on the SCR catalyst temperature TSCR. Therefore, by setting the lean switching determination threshold value STNH3SL with a ratio to the estimated NH3 storage capacity SRNH3MAX, good NOx removing rate can be maintained even when the SCR catalyst temperature TSCR changes.

After the lean transition period has elapsed, the target equivalent ratio KCMD is controlled so as to gradually shift to a value corresponding to the lean air-fuel ratio. This control is specifically attained as described below.

In the present embodiment, the demand intake air amount GCYLCMD is calculated by dividing the demand fuel amount GFUELCMD by the modified target equivalent ratio KCMDBSMOD (equation (8)), and the throttle valve opening TH is controlled so that the detected intake air amount GCYLACT coincides with the demand intake air amount GCYLCMD. The modified target equivalent ratio KMCDBSMOD may sometimes change stepwise upon switching the air-fuel ratio (refer to FIG. 2, time t3), which makes the demand intake air amount GCYLCMD change stepwise.

In this embodiment, the target equivalent ratio KCMD corresponding to the target air-fuel ratio is calculated by the above-described equation (1), and the detected intake air amount GCYLACT in the equation (1) gradually (continuously) changes with a delay to a change in the demand intake air amount GCYLCMD. Further, the fuel injection amount GFUEL in the equation (1) is calculated as a product of the demand fuel amount GFUELCMD and the air-fuel ratio correction coefficient KAF (equation (7)), and both of the demand fuel amount GFUELCMD and the air-fuel ratio correction coefficient KAF gradually change. Accordingly, the fuel injection amount GFUEL gradually changes. Therefore, the target equivalent ratio KCMD gradually changes (does not change stepwise), which prevents a quick change in the engine output torque due to a stepwise change in the air-fuel ratio, to thereby improve drivability of the engine.

Further, the NH3 injection amount GNH3 is calculated so that the NH3 concentration NH3CONS detected on the downstream side of the SCR catalyst 8 coincides with the predetermined target NH3 concentration NH3CONSTRGT which is larger than "0". Accordingly, the NH3 storage amount of the SCR catalyst 8 during the lean operation and the rich transition period can always be maintained at the maximum value. Consequently, the fuel efficiency can be improved due to extension of the lean operation period, for example in the operating condition wherein the switching between the lean operation and the stoichiometric operation is frequently performed.

Further, the NH3 injection is performed during the rich transition period (FIG. 2, t5-t6) starting from the end of the lean operation or the fuel cut operation (FIG. 16, steps S83-S85, S88 and S89, FIG. 17, steps S91, S92, and S95-S98). Therefore, even if the oxygen stored amount in the three-way catalyst 7 increases and the NOx removing rate decreases during the lean operation or the fuel cut operation, the NOx removing is performed by the SCR catalyst 8 during the rich transition period. Consequently, the reducing effect of the NOx emission amount can be maintained immediately after the end of the lean operation or the fuel cut operation.

Further, the rich transition period ends at the time the output VO2 of the O2 sensor disposed downstream of the three-way catalyst 7 reaches the NH3 injection stop threshold value VO2JD, i.e., at the time the NOx removing rate of the three-way catalyst 7 has surely restored. Therefore, increase in the NOx emission amount can surely be prevented.

In this embodiment, the three-way catalyst 7 corresponds to the first catalyst, the SCR catalyst 8 corresponds to the second catalyst, the NH3 injection valve 21 and the NH3 storage device 22 constitute a part of the reducing-agent supply means, the fuel injection valve 5 constitutes a part of the air-fuel ratio control means, and the ECU 10 constitutes a part of the reducing-agent supply means, a part of the air-fuel ratio control means, the determining means, and the estimated reducing-agent stored amount calculating means. Specifically, the fuel injection control module shown in FIG. 5 corresponds to the air-fuel ratio control means, the basic target equivalent ratio calculation block 31 of FIG. 5 corresponds to the determination means, and the NH3 injection control module shown in FIG. 10 corresponds to the reducing-agent supply means.

The present invention is not limited to the embodiment described above, and various modifications may be made. For example, in the above-described embodiment, the NH3 generation control for controlling the O2 sensor output VO2 to the NH3 generation target value VO2NH3 is performed only during the lean transition period. Alternatively, the NH3 generation control may be performed at all times during the stoichiometric operation in which the basic target equivalent ratio KCMDBS is equal to "1.0". By performing the NH3 generation control at all times during the stoichiometric operation, the NH3 generated in the stoichiometric operation is stored in the SCR catalyst 8, which is reflected to the estimated NH3 storage amount STNH3. Therefore, the lean operation can immediately be started at the time the lean operation execution condition is satisfied (at the time the basic target equivalent ratio KCMDBS becomes less than "1.0"), if the estimated NH3 storage amount STNH3 has reached the lean switching determination threshold value STNH3SL. Further, if the estimated NH3 storage amount STNH3 is less than the lean switching determination threshold value STNH3SL, the lean operation can be started at the time NH3 is stored by the amount for compensating the shortage. Consequently, the NH3 supply amount can be reduced, thereby greatly reducing frequency of charging NH3 to the NH3 storage device.

Further, in the above-described embodiment, the sliding mode control algorithm is applied to the calculation of the target equivalent ratio modification amount DKCMD, the air-fuel ratio correction coefficient KAF, and the feedback NH3 injection amount GNH3FB. Alternatively, other well-known feedback control algorithms, for example, a PID (proportional, integral, and differential) control algorithm, an adaptive control algorithm, a model predictive control algorithm, and the like may be applicable. Further, in the above-described embodiment, the IP control algorithm is applied to the calculation of the maximum amount maintaining NH3 injection amount GNH3ST. Alternatively, other well-known feedback control algorithms as described above may also be applicable.

Further, in the above-described embodiment, NH3 (gas) is injected to the exhaust passage as a reducing agent. Alternatively, the urea solution may be injected.

Further, in the above-described embodiment, the SCR catalyst 9 is disposed downstream of the SCR catalyst 8. Alternatively, an oxidation catalyst or a three-way catalyst may be disposed instead of the SCR catalyst 9. Still alternatively, a part (downstream end) of the SCR catalyst 9 may be changed to an oxidation catalyst or a three-way catalyst.

Further, the present invention can also be applied to an exhaust gas purifying apparatus for a direct injection engine in which fuel is directly injected into the combustion chamber of the engine, or a watercraft propulsion engine, such as an outboard engine having a vertically extending crankshaft.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An exhaust gas purifying apparatus for an internal combustion engine, comprising:

a first catalyst provided in an exhaust passage of said engine, which can remove NOx in exhaust gases from said engine when an air-fuel ratio of an air-fuel mixture burning in said engine is in the vicinity of the stoichiometric ratio;

a second catalyst provided downstream of said first catalyst, which can remove NOx in the exhaust gases using a reducing agent;

reducing-agent supply means for supplying the reducing agent to said second catalyst;
air-fuel ratio control means for controlling the air-fuel ratio; and
determining means for determining an execution condition of a lean operation in which the air-fuel ratio is set to a lean air-fuel ratio which is leaner than the stoichiometric ratio,
wherein said air-fuel ratio control means controls the air-fuel ratio to a rich air-fuel ratio which is richer than the stoichiometric ratio, during a lean transition period from the time the execution condition is satisfied, when switching the air-fuel ratio from an air-fuel ratio in the vicinity of the stoichiometric ratio to the lean air-fuel ratio, and said air-fuel ratio control means controls the air-fuel ratio to the lean air-fuel ratio after the lean transition period has elapsed.

2. An exhaust gas purifying apparatus according to claim 1, further comprising an oxygen concentration sensor disposed downstream of said first catalyst, for detecting an oxygen concentration in the exhaust gases,
wherein said air-fuel ratio control means performs the air-fuel ratio control so that the output of said oxygen concentration sensor coincides with a first predetermined value when controlling the air-fuel ratio to an air-fuel ratio in the vicinity of the stoichiometric ratio, and said air-fuel ratio control means performs the air-fuel ratio control during the lean transition period so that the output of said oxygen concentration sensor coincides with a second predetermined value which corresponds to an oxygen concentration less than the oxygen concentration corresponding to the first predetermined value.

3. An exhaust gas purifying apparatus for an internal combustion engine, comprising:
a first catalyst provided in an exhaust passage of said engine, which can remove NOx in exhaust gases from said engine when an air-fuel ratio of an air-fuel mixture burning in said engine is in the vicinity of the stoichiometric ratio;
a second catalyst provided downstream of said first catalyst, which can remove NOx in the exhaust gases using a reducing agent;
reducing-agent supply means for supplying the reducing agent to said second catalyst;
air-fuel ratio control means for controlling the air-fuel ratio; and
determining means for determining an execution condition of a lean operation in which the air-fuel ratio is set to a lean air-fuel ratio which is leaner than the stoichiometric ratio,
wherein when switching the air-fuel ratio from an air-fuel ratio in the vicinity of the stoichiometric ratio to the lean air-fuel ratio, said air-fuel ratio control means performs the switching to the lean air-fuel ratio after a lean transition period has elapsed from the time the execution condition is satisfied, and
said reducing-agent supply means supplies the reducing agent during the lean transition period.

4. An exhaust gas purifying apparatus according to claim 1, wherein said second catalyst can store the reducing agent, and the lean transition period ends at the time an amount of the reducing agent stored in said second catalyst reaches a predetermined storage amount.

5. An exhaust gas purifying apparatus according to claim 3, wherein said second catalyst can store the reducing agent, and the lean transition period ends at the time an amount of the reducing agent stored in said second catalyst reaches a predetermined storage amount.

6. An exhaust gas purifying apparatus according to claim 4, wherein the predetermined storage amount is set to a value which is equal to or greater than 15% of a maximum amount of the reducing agent which is storable in said second catalyst.

7. An exhaust gas purifying apparatus according to claim 1, wherein said air-fuel ratio control means comprises means for gradually changing the air-fuel ratio to the lean air-fuel ratio after the lean transition period has elapsed.

8. An exhaust gas purifying apparatus according to claim 3, wherein said air-fuel ratio control means comprises means for gradually changing the air-fuel ratio to the lean air-fuel ratio after the lean transition period has elapsed.

9. An exhaust gas purifying apparatus according to claim 1, further comprising a reducing-agent concentration sensor disposed downstream of said second catalyst for detecting a concentration of the reducing agent in the exhaust gases,
wherein said reducing-agent supply means performs the supply of the reducing agent so that the concentration of the reducing agent detected by said reducing-agent concentration sensor becomes greater than "0".

10. An exhaust gas purifying apparatus according to claim 3, further comprising a reducing-agent concentration sensor disposed downstream of said second catalyst for detecting a concentration of the reducing agent in the exhaust gases,
wherein said reducing-agent supply means performs the supply of the reducing agent so that the concentration of the reducing agent detected by said reducing-agent concentration sensor becomes greater than "0".

11. An exhaust gas purifying apparatus for an internal combustion engine, comprising:
a first catalyst provided in an exhaust passage of said engine, which can remove NOx in exhaust gases from said engine when an air-fuel ratio of an air-fuel mixture burning in said engine is in the vicinity of the stoichiometric ratio;
a second catalyst provided downstream of said first catalyst, which can remove NOx in the exhaust gases using a reducing agent and store the reducing agent;
reducing-agent supply means for supplying the reducing agent to said second catalyst;
air-fuel ratio control means for controlling the air-fuel ratio;
an oxygen concentration sensor disposed downstream of said first catalyst, for detecting an oxygen concentration in the exhaust gases;
determining means for determining an execution condition of a lean operation in which the air-fuel ratio is set to a lean air-fuel ratio which is leaner than the stoichiometric ratio; and
estimated reducing-agent stored amount calculating means for calculating an estimated reducing-agent stored amount which is an estimated value of an amount of the reducing agent stored in said second catalyst,
wherein when controlling the air-fuel ratio to a value in the vicinity of the stoichiometric ratio, said air-fuel ratio control means performs a reducing-agent generation control in which the air-fuel ratio is controlled so that the output of said oxygen concentration sensor coincides with a predetermined value which enables generation of the reducing agent in said first catalyst,
wherein when switching the air-fuel ratio from an air-fuel ratio in the vicinity of the stoichiometric ratio to the lean air-fuel ratio, said air-fuel ratio control means changes the air-fuel ratio to the lean air-fuel ratio after a lean transition period has elapsed from the time the execution condition is satisfied, the lean transition period being set according to the estimated reducing-agent stored amount.

12. An exhaust gas purifying apparatus for an internal combustion engine, comprising:
   a first catalyst provided in an exhaust passage of said engine, which can remove NOx in exhaust gases from said engine when an air-fuel ratio of an air-fuel mixture burning in said engine is in the vicinity of the stoichiometric ratio;
   a second catalyst provided downstream of said first catalyst, which can remove NOx in the exhaust gases using a reducing agent;
   reducing-agent supply means for supplying the reducing agent to said second catalyst; and
   air-fuel ratio control means for controlling the air-fuel ratio,
   wherein when switching the air-fuel ratio from a lean air-fuel ratio which is leaner than the stoichiometric ratio to an air-fuel ratio in the vicinity of the stoichiometric ratio or an air-fuel ratio which is richer than the stoichiometric ratio, or when switching a fuel cut operation in which the fuel supply to said engine is stopped, to a normal operation in which fuel is supplied to said engine, said reducing-agent supply means supplies the reducing agent during a rich transition period starting from the time of switching the air-fuel ratio or the time of terminating the fuel cut operation.

13. An exhaust gas purifying apparatus according to claim 12, further comprising an oxygen concentration sensor disposed downstream of said first catalyst, for detecting an oxygen concentration in the exhaust gases,
   wherein the rich transition period ends at the time the output of said oxygen concentration sensor reaches a predetermined output value corresponding to an air-fuel ratio which is richer than the lean air-fuel ratio.

14. An exhaust gas purifying apparatus according to claim 12, wherein said air-fuel ratio control means comprises means for gradually reducing the air-fuel ratio when switching the air-fuel ratio from the lean air-fuel ratio to the stoichiometric ratio or the air-fuel ratio which is richer than the stoichiometric ratio.

15. An exhaust gas purifying apparatus according to claim 12, further comprising a reducing-agent concentration sensor disposed downstream of said second catalyst for detecting a concentration of the reducing agent in the exhaust gases,
   wherein said reducing-agent supply means performs the supply of the reducing agent so that the concentration of the reducing agent detected by said reducing-agent concentration sensor becomes greater than "0".

16. An exhaust gas purifying apparatus according to claim 12, wherein said reducing-agent supply means comprises means for supplying the reducing agent by an amount which is necessary for reducing NOx in the exhaust gases discharged from said first catalyst, during the rich transition period.

17. An exhaust gas purifying apparatus according to claim 12, wherein said reducing-agent supply means stops the supply of the reducing agent during the fuel cut operation.

18. An exhaust gas purifying apparatus according to claim 7, further comprising intake air amount detecting means for detecting an intake air amount of said engine; and
   an air-fuel ratio sensor disposed upstream of said first catalyst, for detecting the air-fuel ratio,
   wherein said air-fuel ratio control means calculates a target air-fuel ratio according to an amount of fuel supplied to said engine and the detected intake air amount, and corrects the amount of fuel so that the detected air-fuel ratio coincides with the target air-fuel ratio.

19. An exhaust gas purifying apparatus according to claim 14, further comprising intake air amount detecting means for detecting an intake air amount of said engine; and
   an air-fuel ratio sensor disposed upstream of said first catalyst, for detecting the air-fuel ratio,
   wherein said air-fuel ratio control means calculates a target air-fuel ratio according to an amount of fuel supplied to said engine and the detected intake air amount, and corrects the amount of fuel so that the detected air-fuel ratio coincides with the target air-fuel ratio.

* * * * *